United States Patent
Husain et al.

(10) Patent No.: US 10,322,820 B2
(45) Date of Patent: Jun. 18, 2019

(54) STACKABLE UNMANNED AERIAL VEHICLE (UAV) SYSTEM AND PORTABLE HANGAR SYSTEM THEREFOR

(71) Applicant: SparkCognition, Inc., Austin, TX (US)

(72) Inventors: Syed Mohammad Amir Husain, Georgetown, TX (US); John Rutherford Allen, Alexandria, VA (US)

(73) Assignee: SparkCognition, Inc., Austin, TX (US)

( * ) Notice: Subject to any disclaimer, the term of this patent is extended or adjusted under 35 U.S.C. 154(b) by 0 days.

(21) Appl. No.: 15/704,908

(22) Filed: Sep. 14, 2017

(65) Prior Publication Data

US 2019/0077519 A1    Mar. 14, 2019

(51) Int. Cl.
*B64F 1/22*   (2006.01)
*B60L 11/18*  (2006.01)
*B64C 39/02*  (2006.01)

(52) U.S. Cl.
CPC .......... *B64F 1/222* (2013.01); *B60L 11/1824* (2013.01); *B64C 39/024* (2013.01); *B64C 2201/066* (2013.01); *B64C 2201/143* (2013.01); *B64C 2201/201* (2013.01); *B64C 2201/208* (2013.01)

(58) Field of Classification Search
CPC ............ B64C 39/024; B64C 2201/066; B64C 2201/208; B60L 11/1824
See application file for complete search history.

(56) References Cited

U.S. PATENT DOCUMENTS

| | | | |
|---|---|---|---|
| 5,076,192 A | 12/1991 | Tegel et al. | |
| 5,675,116 A | 10/1997 | Hillenbrand | |
| 5,995,882 A | 11/1999 | Patterson et al. | |
| 6,118,066 A | 9/2000 | Sirmalis et al. | |
| 6,376,762 B1 | 4/2002 | French et al. | |
| 7,290,496 B2 | 11/2007 | Asfar et al. | |
| 7,556,219 B2* | 7/2009 | Page | B64C 39/024 244/63 |
| 8,091,461 B1 | 1/2012 | Buescher et al. | |
| 8,899,903 B1* | 12/2014 | Saad | B65G 67/00 414/392 |
| 9,211,959 B2* | 12/2015 | Teller | B64F 1/10 |
| 9,348,333 B1 | 5/2016 | Buchmueller et al. | |
| 9,387,928 B1* | 7/2016 | Gentry | B64C 39/024 |
| 9,611,017 B2 | 4/2017 | Jeng | |
| 9,623,760 B2* | 4/2017 | Wang | B60L 11/1822 |
| 9,828,094 B2* | 11/2017 | McMillion | B64C 39/024 |
| 9,944,404 B1 | 4/2018 | Gentry | |

(Continued)

*Primary Examiner* — Brian M O'Hara
*Assistant Examiner* — Keith L Dixon
(74) *Attorney, Agent, or Firm* — Toler Law Group, PC

(57) ABSTRACT

An unmanned aerial vehicle (UAV) system comprises a hangar structure configurable to mount on a host platform. The hangar structure comprises electrical circuits comprising a charging circuit and a communications circuit. The UAV system further comprises a plurality of stackable UAVs. The plurality of stackable UAVs comprise respective batteries and control circuits. The plurality of stackable UAVs are configured to cooperate with the charging circuit to charge the batteries and to cooperate with the communications circuit to communicate with the control circuits while the plurality of stackable UAVs are in a stacked configuration within the hangar structure.

20 Claims, 16 Drawing Sheets

(56) References Cited

U.S. PATENT DOCUMENTS

| | | |
|---|---|---|
| 2003/0152892 A1 | 8/2003 | Huang et al. |
| 2008/0041294 A1 | 2/2008 | Diorio et al. |
| 2011/0266086 A1 | 11/2011 | Welker et al. |
| 2013/0081245 A1* | 4/2013 | Vavrina ............... B60L 11/1822 29/402.08 |
| 2013/0199792 A1 | 8/2013 | Backes |
| 2015/0298786 A1 | 10/2015 | Stigler et al. |
| 2016/0039541 A1* | 2/2016 | Beardsley ........... B60L 11/1816 701/2 |
| 2016/0244135 A1 | 8/2016 | Farber et al. |
| 2016/0327956 A1 | 11/2016 | Zhang et al. |
| 2017/0285203 A1 | 10/2017 | Fyffe et al. |
| 2017/0350558 A1 | 12/2017 | Heinen et al. |

\* cited by examiner

STACKABLE UNMANNED AERIAL VEHICLE (UAV) SYSTEM AND PORTABLE HANGAR SYSTEM THEREFOR

CROSS-REFERENCE TO RELATED APPLICATION(S)

The present application is related to U.S. Pat. No. 10,065,717 entitled "AUTONOMOUS VESSEL FOR UNMANNED COMBAT AERIAL VEHICLE (UCAV) CARRIER OPERATIONS" (U.S. patent application Ser. No. 15/704,855); U.S. Pat. No. 10,065,718 entitled "ANTI-AIRCRAFT AUTONOMOUS UNDERSEA SYSTEM (AUS) WITH MACHINE VISION TARGET ACQUISITION" (U.S. patent application Ser. No. 15/704,949); U.S. Pat. No. 10,207,816 entitled "AERIALLY DISPERSIBLE MASSIVELY DISTRIBUTED SENSORLET SYSTEM" (U.S. patent application Ser. No. 15/704,991); and U.S. Pat. No. 9,983,581 entitled "ARTIFICIAL INTELLIGENCE AUGMENTED REALITY COMMAND, CONTROL AND COMMUNICATIONS SYSTEM" (U.S. patent application Ser. No. 15/705,027), the entirety of which are herein incorporated by reference.

BACKGROUND

Field of the Disclosure

The present disclosure relates generally to an unmanned aerial vehicle (UAV) system and, more particularly, to a system comprising multiple UAVs.

Background of the Disclosure

Assets, such as naval vessels, submarines, and other assets on, under, or near a surface of water and personnel, vehicles, and structures on land, face threats, such as aircraft, unmanned combat aerial vehicles (UCAV), cruise missiles, speedboats, hydrofoils, anti-submarine ordnance, and anti-submarine ordnance delivery systems. As technology makes it easier and less expensive to construct and deploy systems that pose such threats, a corresponding increase in the availability and capability of technology to protect against such threats is needed.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Figure 1:
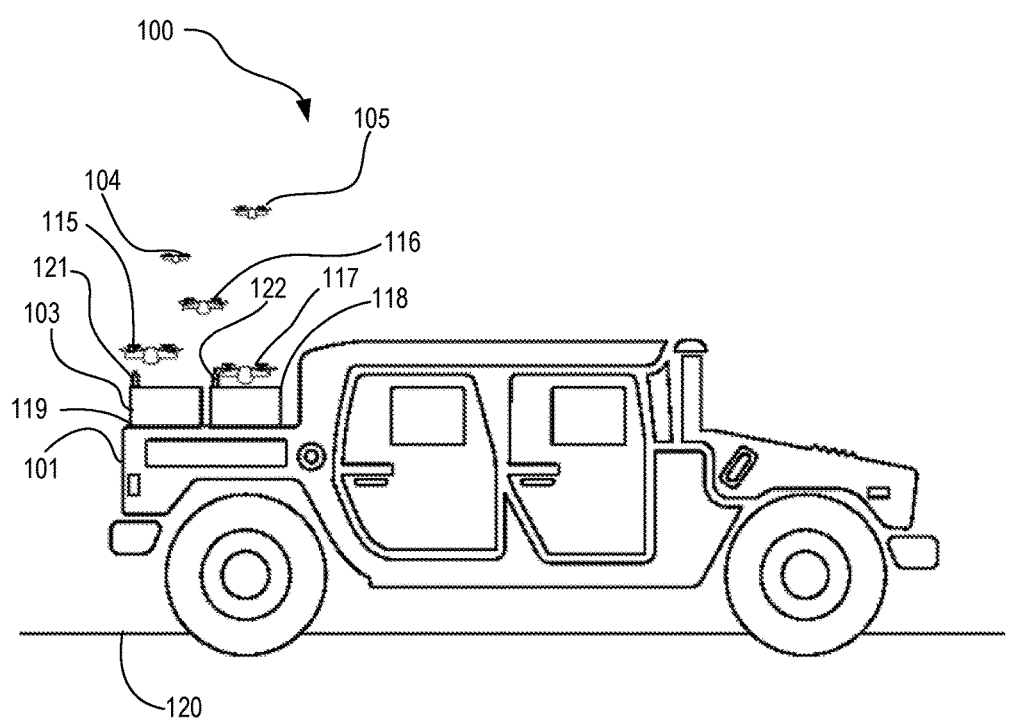
FIG. 1 is an elevation view diagram illustrating a UAV system comprising a hangar system therefor in accordance with at least one embodiment.

A system comprising a UAV magazine and sensors is provided. In accordance with at least one embodiment, the sensors may be provided in at least a portion of the UAVs deployable from the magazine. For example, the UAVs can comprise at least one non-combat UAV and at least one unmanned combat aerial vehicle (UCAV) (e.g., a surveillance drone and shooter drones). As another example, the UAVs can consist of non-combat UAVs not themselves bearing armament. As yet another example, the UAVs can consist of UCAVs.

Such a system is deployable from any of a plurality of host platforms, such as from an amphibious platform (e.g., by personnel conducting amphibious assault operations), from vehicles, from speedboats, and from other platforms. A modular configuration is provided to allow easy portability, consistent geometry, quick installation, and rapid deployment. Examples of use cases include non-line-of-sight targeting, swarm surveillance, coordinated swarm attack, and countering dispersed and large scale threats, such as dispersed speedboat or hydrofoil threats.

In accordance with at least one embodiment, the hangars for the UAVs can act as a drone "carrier," transporting UAVs to where they are to be deployed and providing for the take-off and landing of the UAVs, as well as subsequent transportation of the UAVs. In a particular example, the UAVs are stackable UAVs, which are configured to be stacked within the hangar for storage and transportation. In this example, the stackable UAVs include interfaces to enable communication of data, control signals, power, and other electrical signals from the hangar to each of the UAVs stacked within the hangar.

Examples of roles that the UAV system is capable of performing when equipped with unmanned combat aerial vehicles (UCAVs) include directing such UCAVs to perform anti-cruise-missile (anti-CM) and anti-anti-submarine-warfare (anti-ASW) operations. These systems can use swarm algorithms capable of creating "barrages." As an example, these systems can provide autonomous swarms of aerial mines. As another example, these systems can also be used as "rear guards" to subvert an enemy swarm, such as a hydrofoil or high-speed gunboat attack on a large scale.

In accordance with at least one embodiment, a UAV system provides protection against threats, for example, personnel, vehicles, vessels, cruise missiles, anti-submarine-warfare (ASW) ordnance, and aircraft. The UAV system can comprise an ordnance subsystem. The ordnance subsystem comprises an ordnance magazine configured to store ordnance. A hangar structure can be configured to provide an ordnance magazine. An example of ordnance the UAV system may store comprises ordnance deliverable via an UCAV. The ordnance is deployable against a target. The target can be autonomously identified by the UAV system, or the target can be remotely identified by another asset, such as a UCAV, a peer UCAV, a peer UAV system, a naval surface vessel, a naval subsurface vessel, an aircraft, or a spacecraft, such as a satellite. Alternatively, the target can be cooperatively identified by the UAV system and at least one other asset or by a UCAV and at least one other asset.

In accordance with at least one embodiment, a plurality of UAV systems can perform cooperative operations, such as cooperatively engaging threats. For example, the plurality of UAV systems can coordinate with each other to observe, confirm, track, and engage threats by efficiently allocating resources, such as ordnance, among themselves. As one example, the plurality of UAV systems can create a "dome" of protection around assets, such as naval vessels or civilian vessels, or a "cloud" of protection between a threat and such an asset. As another example, one or more UAV systems can provide a low-maintenance deterrent against threats even in absence of proximate assets, for example, by providing a high-endurance deployed system ready to detect and engage threats, such as anti-submarine warfare (ASW) ordnance or a delivery system for delivering such ordnance. As an example, a UAV system may be an autonomous UAV system hosting UCAVs.

Depending on the endurance capabilities of a UAV system, the UAV system can be configured, as one example, to have its UAVs remain within a sortie range of the host platform from which the UAVs took flight, or, as another example, to have the host platform deploy the UAVs and depart the area in which the UAVs are to operate. In accordance with the latter example, the host platform can return to the area to retrieve the UAVs, or, as another example, another host platform can arrive in the area to retrieve the UAVs. As one example, the host platform or another host platform can arrive in the area according to a pre-determined schedule. As another example, the host platform or another host platform can arrive in the area based on coordination with the deployed UAVs. For example, at least one of the deployed UAVs can transmit a request for the host platform or another host platform to return to the area. As one example, the request may be transmitted directly from the at least one of the deployed UAVs to the host platform or another host platform. As another example, the request may be transmitted to a communication relay element, such as a communication satellite, which may relay the request to the host platform or another host platform.

FIG. 1 is an elevation view diagram illustrating a UAV system in accordance with at least one embodiment. UAV system 100 comprises a plurality of UAVs 104, 105, 115, 116, and 117 deployable from a hangar system 103 comprising hangars 119 and 118, which are mounted on host platform 101, in this case a high mobility multipurpose wheeled vehicle (HMMWV), more commonly known as a "humvee." The HMMWV, being a land vehicle, is situated over land 120. Other embodiments may include hangar system 103 being mounted on a vessel situated over water, an aerial platform, such as a balloon or an airship, or a structure situated at a fixed location. In accordance with at least one embodiment, hangar 119 has a communicative element, such as an antenna or beacon 121, and hangar 118 has a communicative element, such as an antenna or beacon 122. Antennas or beacons 121 and 122 can be used, for example, to communicate with the plurality of UAVs 104, 105, 115, 116, and 117. For example, antennas or beacons 121 and 122 can mark and communicate the locations of hangars 119 and 118 to guide UAVs 104, 105, 115, 116, and 117 for landing in hangars 119 and 118. As another example, antennas or beacons 121 and 122 can communicate information, such as sensor information, tracking information, coordination information, and command information to or from UAVs 104, 105, 115, 116, and 117. The ability to communicate the locations of hangars 119 and 118 can be useful, for example, if the UAVs landing at hangars 119 and 118 took flight from a different hangar at a different location or if hangars 119 and 118 moved, for example, by virtue of the mobility of host platform 101, since the UAVs took flight.

In accordance with at least one embodiment, hangars 119 and 118 provide openings to allow UAVs stowed in hangars 119 and 118 to be delivered out of UAV system 100 and to allow UAVs to land in hangars 119 and 118. Hangars 119 and 118 can comprise movable covers to provide selective closure of such openings. As shown, UAVs 104, 105, 115, 116, and 117 are examples of UAVs deployable from hangars 119 and 118 through such openings.

As one example, UAV system 100 may be maintained in a pre-deployment configuration, guided by communication with a peer network or a command and control system to deploy UAVs upon command. As another example, UAV system 100 can be maintained in a deployed configuration, with UAV system 100 configured to have UAVs take flight in advance of any detection of any object of interest for the UAVs to reconnoiter or engage. For example, the deployed configuration may be used to scout an area or provide surveillance for force protection purposes or target detection purposes.

Figure 2:
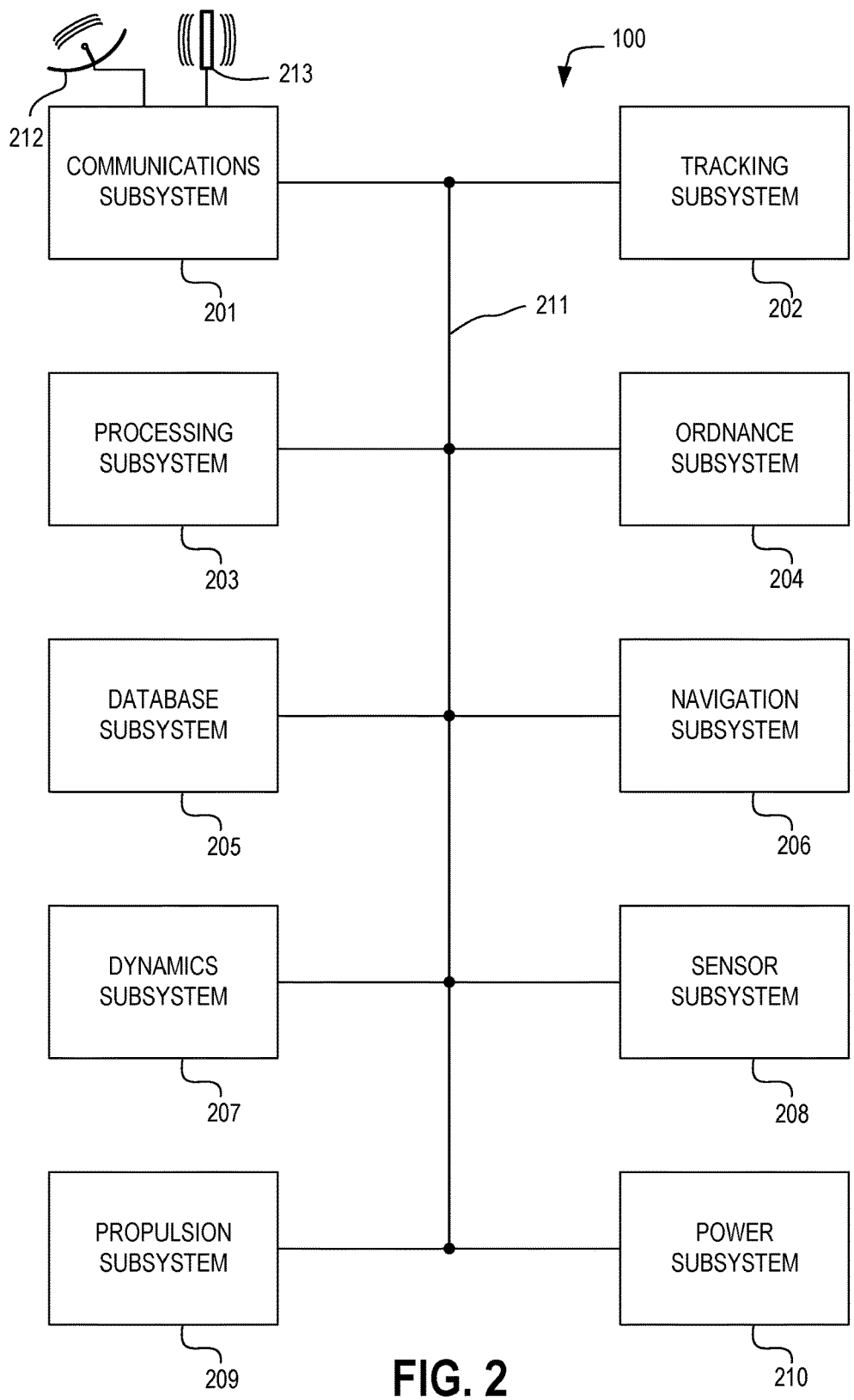
FIG. 2 is a block diagram illustrating a UAV system in accordance with at least one embodiment.

FIG. 2 is a block diagram illustrating a UAV system in accordance with at least one embodiment. UAV system 100 comprises communications subsystem 201, tracking subsystem 202, processing subsystem 203, ordnance subsystem 204, database subsystem 205, navigation subsystem 206, dynamics subsystem 207, sensor subsystem 208, propulsion subsystem 209, and power subsystem 210. Each of such subsystems is coupled to at least another of such subsystems. In the illustrated example, the subsystems are coupled to each other via interconnect 211. Communications subsystem 201 may be coupled to antennas, such as satellite antenna 212 and terrestrial antenna 213. Other embodiments may be implemented with a subset of the above subsystems or with additional subsystems beyond the above subsystems or a subset thereof.

The elements shown in FIG. 2 may, for example, be distributed among components of the UAV system. As an example, one or more elements shown in FIG. 2 may be incorporated in one or more UAVs, while another one or more elements may be incorporated in a hangar structure from which UAVs may be deployed or in a host platform to which the hangar structure may be mounted. As another example, multiple instances of one or more elements shown in FIG. 2 may be provided, with one or more instances incorporated in one or more UAVs and another one or more instances incorporated in a hangar structure or host platform. As may be desired, one or more elements shown in FIG. 2 may be omitted from the UAV system, according to at least one embodiment.

Figure 3:
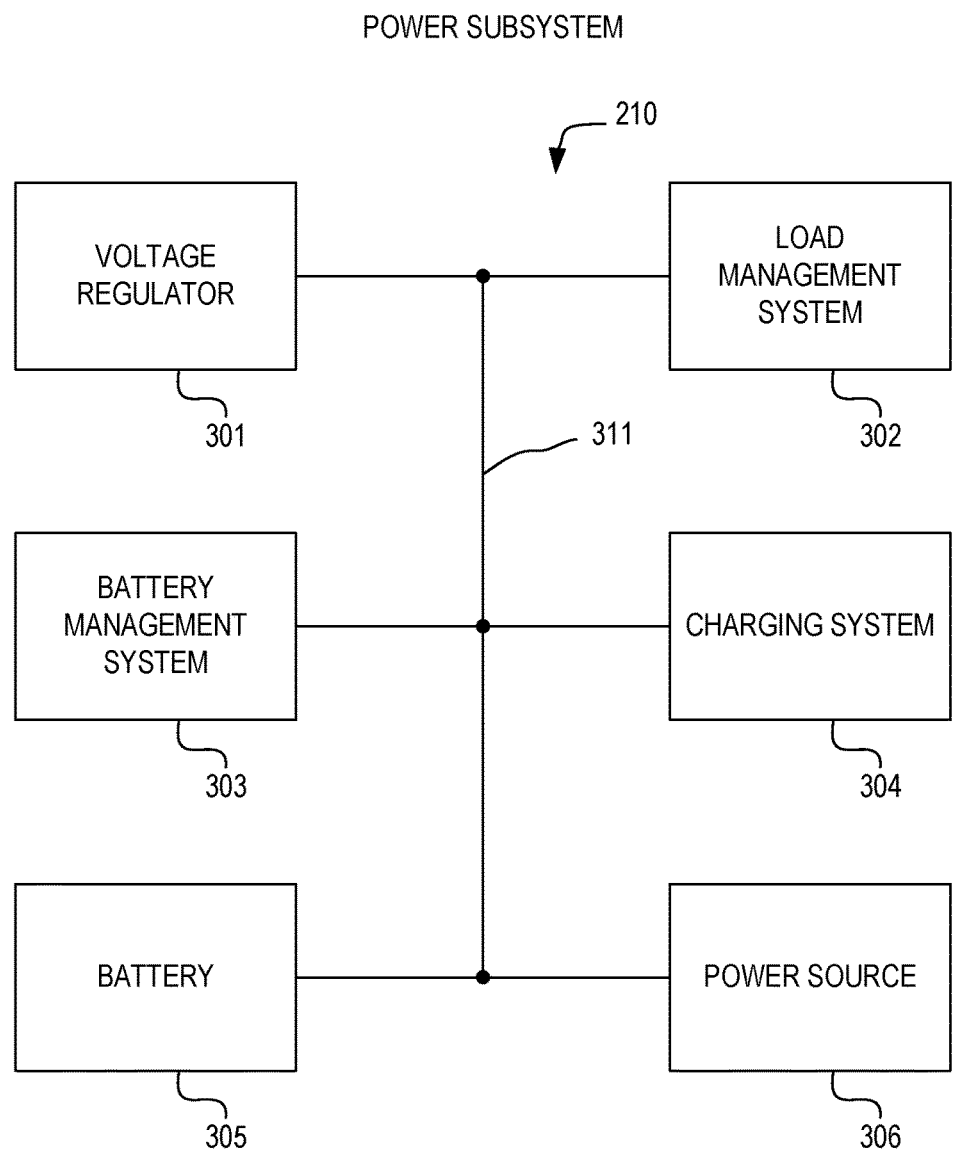
FIG. 3 is a block diagram illustrating a power subsystem of a UAV system in accordance with at least one embodiment.

FIG. 3 is a block diagram illustrating a power subsystem of a UAV system in accordance with at least one embodiment. Power subsystem 210 comprises voltage regulator 301, load management system 302, battery management system 303, charging system 304, battery 305, and power source 306. Each of such elements is coupled to at least another of such elements. In the illustrated example, the elements are coupled to each other via interconnect 311.

As examples, power source 306 can be a solar power source, a wind power source, a wave power source, a hydrothermal power source, a chemical fuel power source, a nuclear power source, or another type of power source. As an example, a host platform to which a hangar structure may be mounted can provide power source 306. Power from power source 306 may be provided to the UAV system via an electrical connector and an electrical conduit, as an example. Charging system 304 can be configured to charge battery 305 using power obtained from power source 306. Battery management system can manage a battery state of battery 305 and can monitor charging and discharging of battery 305. Load management system 302 can monitor power used by loads, such as other subsystems shown in FIG. 2. Voltage regulator 301 can provide one or more regulated voltages to the loads.

Figure 4:
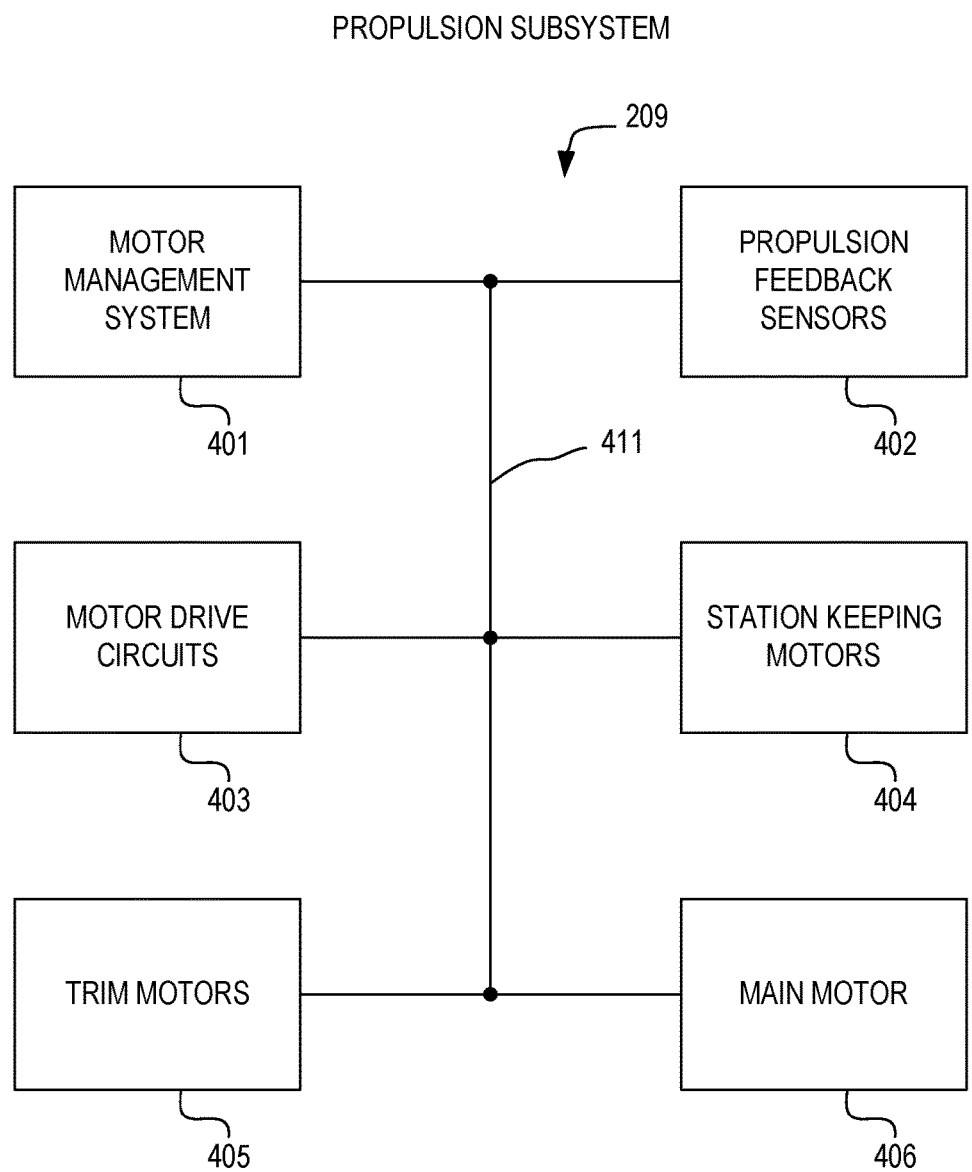
FIG. 4 is a block diagram illustrating a propulsion subsystem of a UAV system in accordance with at least one embodiment.

FIG. 4 is a block diagram illustrating a propulsion subsystem of a UAV system in accordance with at least one embodiment. Propulsion subsystem 209 comprises motor management system 401, propulsion feedback sensors 402, motor drive circuits 403, station keeping motors 404, trim motors 405, and main motor 406. Each of such elements is coupled to at least another of such elements. In the illustrated example, the elements are coupled to each other via interconnect 411.

Main motor 406 can provide main propulsion of UAV system 100. Such main propulsion can allow UAV system 100 to move to a deployment location. Such main propulsion can also allow UAV system 100 to move in relation to other vessels, such as other instances of UAV system 100 and a formation of naval vessels. Trim motors 405 can provide propulsive force to counteract force that would change the orientation of UAV system 100 away from a desired orientation. As examples, trim motors 405 can compensate for forces that would tend to impart undesired pitch, yaw, and roll to UAV system 100. Station keeping motors 404 can provide propulsive force to counteract currents that would cause UAV system 100 to drift away from its deployment location. As examples, station keeping motors 404 can be oriented along a plurality of axes, such as x, y, and z orthogonal axes, to allow station keeping in three dimensions. Motor drive circuits 403 are coupled to main motor 406, trim motors 405, and station keeping motors 404 to provide electrical motor drive signals to drive such motors. Power for the electrical motor drive signals can be obtained from power subsystem 210. Propulsion feedback sensors 402 can monitor the propulsion provided by the motors of propulsion subsystem 209. As an example, propulsion feedback sensors 402 can include pressure sensors to measure pressures produced by movement of water by propulsion system elements. As another example, propulsion feedback sensors 402 can include accelerometers to measure acceleration provided by propulsion system elements. Motor management system 401 can use information from propulsion feedback sensors 402 to cause motor drive circuits 403 to drive main motor 406, trim motors 405, and station keeping motors 404 to provide desired propulsion.

Figure 5:
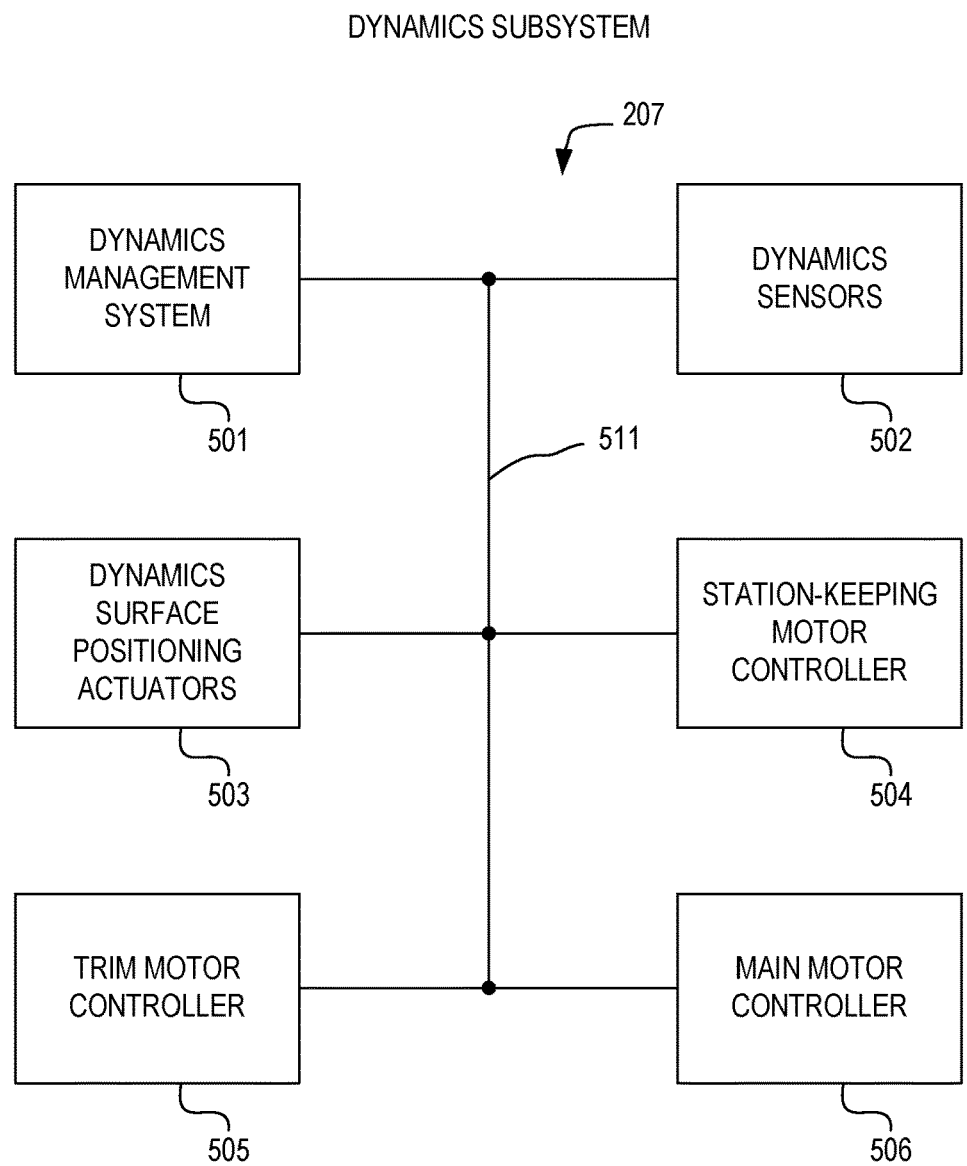
FIG. 5 is a block diagram illustrating a dynamics subsystem of a UAV system in accordance with at least one embodiment.

FIG. 5 is a block diagram illustrating a dynamics subsystem of a UAV system in accordance with at least one embodiment. Dynamics subsystem 207 comprises dynamics management system 501, dynamics sensors 502, dynamics surface positioning actuators 503, station-keeping motor controller 504, trim motor controller 505, and main motor controller 506. Each of such elements is coupled to at least another of such elements. In the illustrated example, the elements are coupled to each other via interconnect 511.

Dynamics sensors 502 sense dynamic forces and responsiveness of UAV system 100 to such dynamic forces. Examples of dynamic sensors 502 include pressure sensors, strain gauges, and fluid dynamics sensors. Dynamics management system 501 uses the sensed data from dynamics sensors 502 to provide dynamics control signals to dynamics surface positioning actuators 503, to main motor controller 506, to trim motor controller 505, and to station-keeping motor controller 504. Dynamics surface positioning actuators 503 can comprise, for example, actuators to orient hydrodynamic surfaces of UAV system 100 to adjust the responsiveness of UAV system 100 to hydrodynamic forces exerted upon it. Main motor controller 506, trim motor controller 505, and station-keeping motor controller 504 can provide dynamics control signals to adjust the operation of main motor 406, trim motors 405, and station keeping motors 404, respectively, as dictated by dynamics management system 501 in response to dynamics sensor data from dynamics sensors 502.

Figure 6:
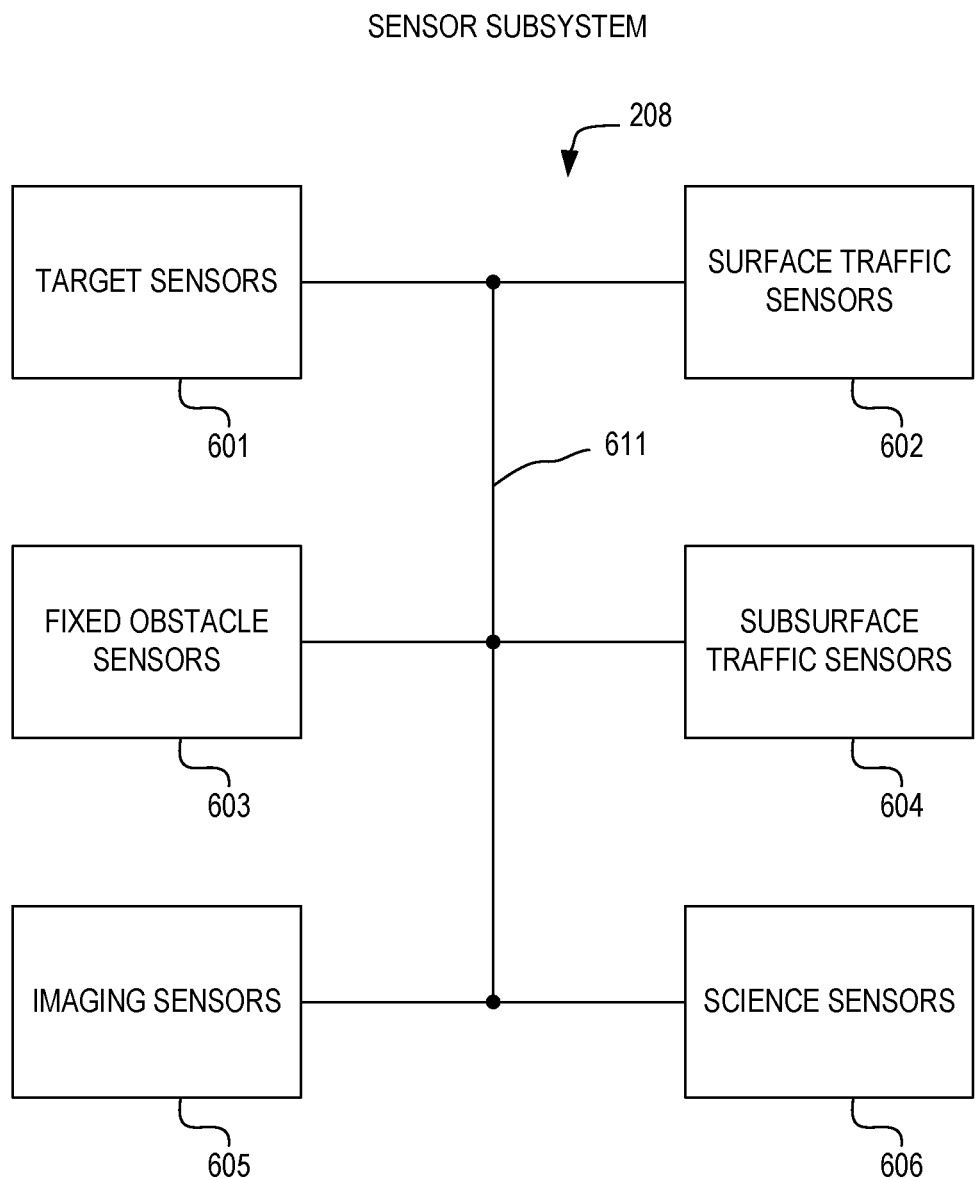
FIG. 6 is a block diagram illustrating a sensor subsystem of a UAV system in accordance with at least one embodiment.

FIG. 6 is a block diagram illustrating a sensor subsystem of a UAV system in accordance with at least one embodiment. Sensor subsystem 208 comprises target sensors 601, surface traffic sensors 602, fixed obstacle sensors 603, subsurface traffic sensors 604, imaging sensors 605, and science sensors 606. Each of such elements is coupled to at least another of such elements. In the illustrated example, the elements are coupled to each other via interconnect 611.

Target sensors 601 include sensors suitable for sensing a target suitable for engagement with ordnance subsystem 204 of UAV system 100. Examples of target sensors 601 include a monostatic radar, a bistatic radar receiver, a bistatic radar transmitter, an infrared sensor, and a passive acoustic sensor. Surface traffic sensors 602 include sensors suitable for sensing traffic of surface vessels on a surface of water in which UAV system 100 operates. Examples of surface traffic sensors 602 include a monostatic radar, a bistatic radar receiver, a bistatic radar transmitter, an infrared sensor, an active acoustic sensor, and a passive acoustic sensor. Fixed obstacle sensors 603 include sensors suitable for sensing fixed obstacles. Examples of fixed obstacle sensors 603 include a monostatic radar, a bistatic radar receiver, a bistatic radar transmitter, an infrared sensor, an active acoustic sensor, a passive acoustic sensor, and a depth profiler. Subsurface traffic sensors 604 include sensors suitable for sensing traffic of subsurface vessels below a surface of water in which UAV system 100 operates. Examples of subsurface traffic sensors 604 include an active acoustic sensor, a passive acoustic sensor, and a magnetic sensor. The magnetic sensor may include, for example, a magnetometer or a magnetic anomaly detector. Imaging sensors 605 include sensors capable of obtaining images. Examples of imaging sensors 605 include visible still cameras, visible video cameras, infrared cameras, ultraviolet cameras, star tracking cameras, and other cameras. While sensors may be carried by one or more UAVs, at least one sensor may be separable from the UAV. As an example, one or more UAVs may be configured to release a separable sensor package, such as a buoy or a ground-based sensor package. As an example, the separable sensor package may provide sensing based on a physical connection with a medium, such as water or earth, through which detectable signals may propagate. Accordingly, as examples, acoustic, magnetic, seismic, and other sensors may be separably deployed by one or more UAVs.

Imaging sensors 605 can comprise sensors such as side scan sonar (SSS), synthetic aperture sonar (SAS), multibeam echosounders (MBES), imaging sonar, sub-bottom profiler (SBP), video cameras, still cameras, infrared cameras, multispectral cameras, and other types of imaging sensors. Science sensors 606 can comprise sensors such as conductivity, temperature, and depth (CTD) sensors, conductivity and temperature (CT) sensors, fluorometers, turbidity sensors, sound velocity sensors, beam attenuation meters, scattering meters, transmissometers, and magnetometers.

Figure 7:
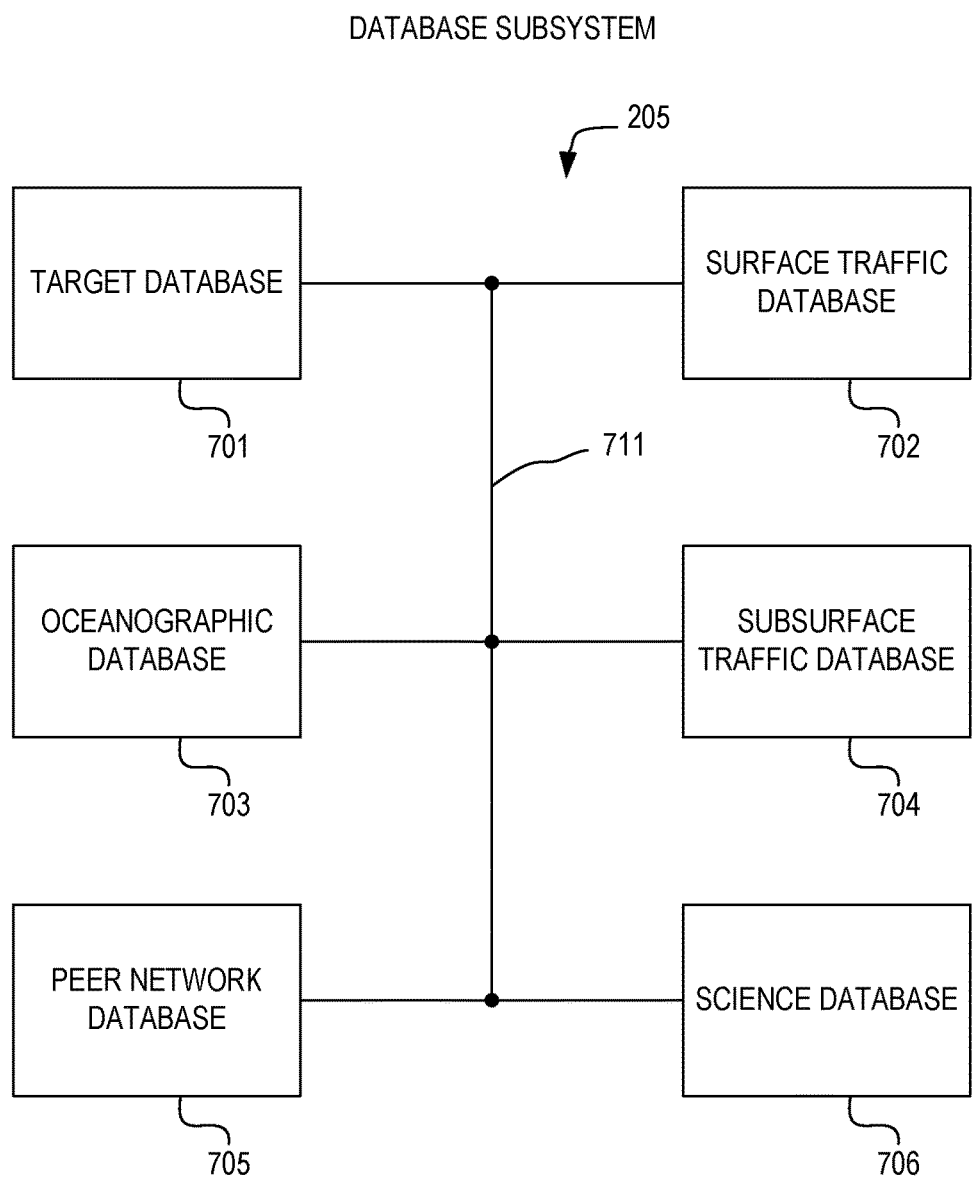
FIG. 7 is a block diagram illustrating a database subsystem of a UAV system in accordance with at least one embodiment.

FIG. 7 is a block diagram illustrating a database subsystem of a UAV system in accordance with at least one embodiment. Database subsystem 205 comprises target database 701, surface traffic database 702, oceanographic database 703, subsurface traffic database 704, peer network database 705, and science database 706. Each of such elements is coupled to at least another of such elements. In the illustrated example, the elements are coupled to each other via interconnect 711.

Target database 701 is a database for storing information characterizing potential targets and other information useful for distinguishing non-targets from targets. As examples, target database 701 may include information such as identification friend or foe (IFF) information, radar signature information, infrared signature information, and acoustic signature information as may pertain to aircraft. Surface traffic database 702 is a database for storing information characterizing potential surface traffic. As examples, surface traffic database 702 may include information such as radar signature information, infrared signature information, and acoustic signature information as may pertain to surface vessels. Oceanographic database 703 is a database for storing information characterizing physical features of the operating environment, such as an ocean, of UAV system 100. As examples, oceanographic database 703 may include information as to ocean floor topography, ocean currents, islands, coastlines, and other features. Subsurface traffic database 704 is a database for storing information characterizing potential subsurface traffic. As examples, subsurface traffic database 704 may include information such as acoustic signature information as may pertain to subsurface vessels. Peer network database 705 is a database for storing information characterizing a relationship of UAV system 100 to other instances of UAV system 100 capable of operating cooperatively as peers with UAV system 100. As examples, subsurface traffic database 704 may include information as to locations of peers, sensor parameters of peers, ordnance capabilities of peers, readiness of peers, and other properties of peers. Science database 706 is a database for storing information of a scientific nature, such as water temperature, water salinity, water conductivity, water density, water turbidity, air temperature, barometric pressure, sky conditions, and other information descriptive of conditions of the environment within which UAV system 100 operates.

Figure 8:
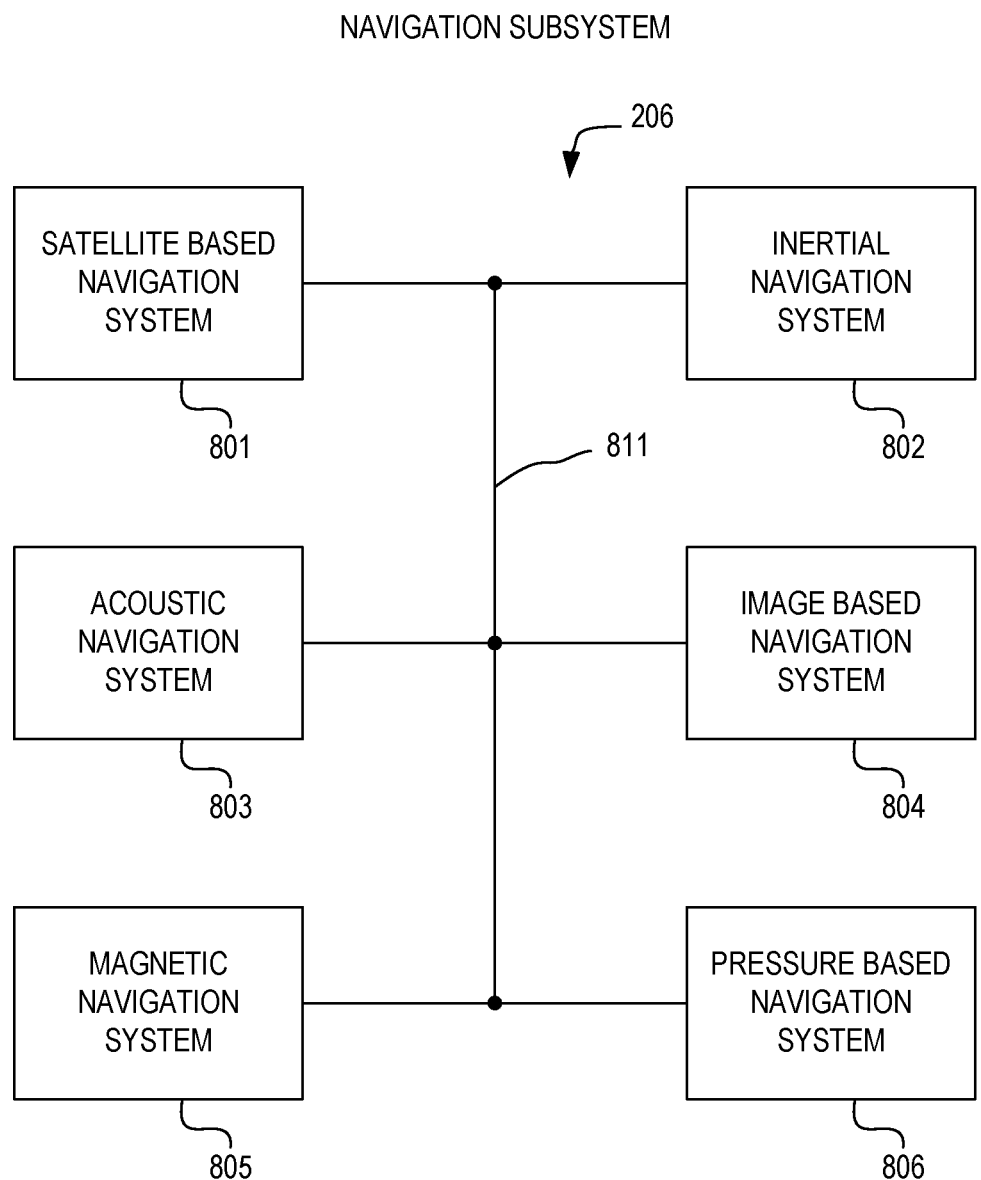
FIG. 8 is a block diagram illustrating a navigation subsystem of a UAV system in accordance with at least one embodiment.

FIG. 8 is a block diagram illustrating a navigation subsystem of a UAV system in accordance with at least one embodiment. Navigation subsystem 206 comprises satellite based navigation system 801, inertial navigation system 802, acoustic navigation system 803, image based navigation system 804, magnetic navigation system 805, and pressure based navigation system 806. Each of such elements is coupled to at least another of such elements. In the illustrated example, the elements are coupled to each other via interconnect 811.

Satellite based navigation system 801 can comprise, for example, a Global Navigation Satellite System (GLONASS) receiver and a Global Positioning System (GPS) receiver, which may include a Selective Availability/Anti-Spoofing Module (SAASM), a precise pseudo-random code (P-code) module, and an encrypted precise pseudo-random code (Y-code) module. Inertial navigation system 802 can comprise an inertial navigation sensor (INS) and an inertial measurement unit (IMU), which can comprise at least one of an accelerometer, a gyroscope, and a magnetometer.

Acoustic navigation system 803 can comprise, for example, Ultra Short Baseline (USBL) system, Long Baseline (LBL) system, a Doppler Velocity Logger (DVL), and an acoustic tracking transponder. Magnetic navigation system 805 can comprise, for example, a compass. Pressure based navigation system 806 can comprise, for example, an altimeter and a pressure sensor.

Figure 9:
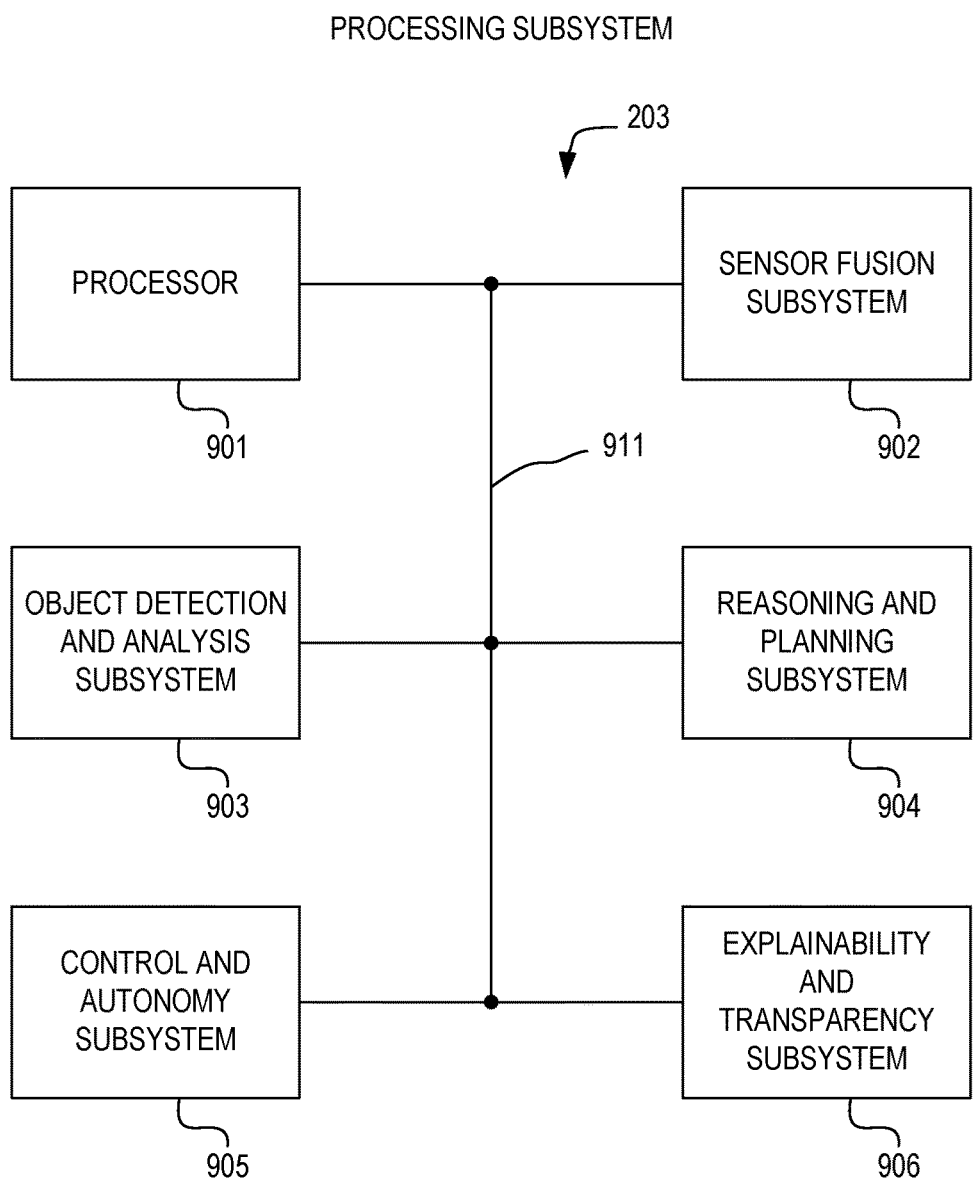
FIG. 9 is a block diagram illustrating a processing subsystem of a UAV system in accordance with at least one embodiment.

FIG. 9 is a block diagram illustrating a processing subsystem of a UAV system in accordance with at least one embodiment. Processing subsystem 203 comprises processor 901, sensor fusion subsystem 902, object detection and analysis subsystem 903, reasoning and planning subsystem 904, control and autonomy subsystem 905, and explainability and transparency subsystem 906. Each of such elements is coupled to at least another of such elements. In the illustrated example, the elements are coupled to each other via interconnect 911.

Processor 901 is a data processor for processing information within UAV system 100. Processor 901 can cooperate with subsystems of processing subsystem 203, such as sensor fusion subsystem 902, object detection and analysis subsystem 903, reasoning and planning subsystem 904, control and autonomy subsystem 905, and explainability and transparency subsystem 906. As one example, processing subsystem 203 can be implemented to utilize heterogeneous computing, wherein the different elements of processing subsystem 203 are implemented using different configurations of processor circuits, in accordance with at least one embodiment. As another example, a homogeneous computing system comprising similar configurations of processor circuits, such as a symmetric multiprocessor (SMP) system, can be used to implement processing subsystem 203.

Sensor fusion subsystem 902 processes sensor data obtained by sensors, such as sensors of sensor subsystem 208. Sensor data can be obtained from sensors local to UAV system 100 or from remote sensors located elsewhere, for example, on other instances of UAV system 100, on other vessels, or on other platforms, such as satellites, aircraft, or fixed locations. Sensor fusion subsystem 902 provides fidelity enhancement with multi-sensor feeds. As an example, sensor fusion subsystem 902 compares sensor data from multiple sensors to cross-validate the sensor data. The sensor data being cross-validated can be homogeneous, having been obtained from different instances of a similar type of sensor, can be heterogeneous, having been obtained from different types of sensors, or can have homogeneous and heterogeneous aspects, having been obtained from different instances of a similar type of sensor for each of a plurality of different types of sensors.

Sensor fusion subsystem 902 provides noise reduction and bad data identification via deep artificial neural networks (ANNs). Deep artificial neural networks are configured to recognize spurious data that, if relied upon, could lead to improper decision making. The deep artificial neural networks can acquire knowledge that can be stored within the adaptive elements of the deep artificial neural networks, and that acquired knowledge can be used for subsequent decision making. As an example, as a wide range of sensor data is obtained over time, sensor fusion subsystem 902 can learn to distinguish between, as examples, civilian aircraft, friendly military aircraft, and hostile military aircraft.

Sensor fusion subsystem 902 provides automated feature construction and evolution. By processing sensor data to identify features of a potential target that can be recognized from the information provided by the sensor data and adaptively modifying the processing of the sensor data over time to improve the identification of such features, feature recognition provided by sensor fusion subsystem 902 can improve identification of actual targets from among potential targets.

Sensor fusion subsystem 902 can combine augmented reality (AR) with virtual reality (VR) and predictive algorithms to facilitate application of information obtained from sensors to create an easily comprehensible presentation of a situation. For example, sensor fusion subsystem 902 can effectively filter out extraneous information, such as weather conditions and countermeasure effects, to provide a clear presentation of a target. The presentation of the target can be made with respect to UAV system 100, for example, with respect to the engagement range of the ordnance of ordnance subsystem 204 of UAV system 100.

Object detection and analysis subsystem 903 utilizes machine vision techniques to process sensor data to recognize an object the sensor data represents. Object detection and analysis subsystem 903 provides multi-spectral, cross-sensor analysis of sensor data, correlating sensor data of different types and of different sensors to assemble an accurate characterization of a detected object. Object detection and analysis subsystem 903 can perform new object discovery, utilizing unsupervised learning, which can identify the presence of new types of objects not previously known to exist or not previously having been identifiable based on previous processing of sensor data. Object detection and analysis subsystem 903 can provide a comprehensive vision of detectable objects and can apply ontologies to characterize such objects and their potential significance in a battlespace.

Reasoning and planning subsystem 904 can apply strategy generation techniques and strategy adaptation techniques to develop and adapt a strategy for protecting UAV system 100 and other assets in concert with which UAV system 100 may be deployed, for example, other instances of UAV system 100 and naval vessels that may be protected by UAV system 100. Reasoning and planning subsystem 904 can apply reality vectors to provide a thought-vector-like treatment of a real state of UAV system 100 and its surroundings. Reasoning and planning subsystem 904 can apply reinforcement learning and evolutionary processes to accumulate knowledge during the course of its operation.

Control and autonomy subsystem 905 utilizes platforms to transform a large amount of data into situational awareness. For example, control and autonomy subsystem 905 can utilize simulation engines to transform data, such as sensor data and object information obtained from sensor data, into an understanding of the situation faced by UAV system 100 that allows control and autonomy subsystem 905 to initiate action, such as engagement of a target using the ordnance of ordnance subsystem 204. Control and autonomy subsystem 905 can utilize reinforcement learning applications to evolve controllers, which can be used to autonomously control UAV system 100. Control and autonomy subsystem 905 can utilize swarm constrained deep learning for distributed decision making.

Control and autonomy subsystem 905 can coordinate flight of a plurality of UCAVs, for example, to create a swarm of UCAVs. The swarm parameters can be configured to assure safe separation of UCAVs from each other but a swarm configuration of appropriate density to provide interception of airborne threats. As an example, the swarm parameters can be selected to provide an evenly spaced distribution of UCAVs. As another example, the swarm parameters can be selected to provide a weighted distribution of UCAVs. The weighted distribution can have a greater density of UCAVs over a space in which a threat is expected to have a higher likelihood of flying and a lesser density of UCAVs over another space in which a threat is expected to have a lower likelihood of flying.

Control and autonomy subsystem 905 can interact with other subsystems, such as sensor subsystem 208 and tracking subsystem 202 to adaptively control the operation of the UCAVs via communications subsystem 201.

Explainability and transparency subsystem 906 can perform analysis and observation by applying natural language processing (NLP) and natural language generation (NLG) to produce natural language reports. Explainability and transparency subsystem 906 can perform hypothesis validation, enabling autonomous research to be performed by UAV system 100. Explainability and transparency subsystem 906 can perform automated ontology discovery, allowing UAV system 100 to recognize and respond to threats that do not fit within an existing knowledge base of threats.

Figure 10:
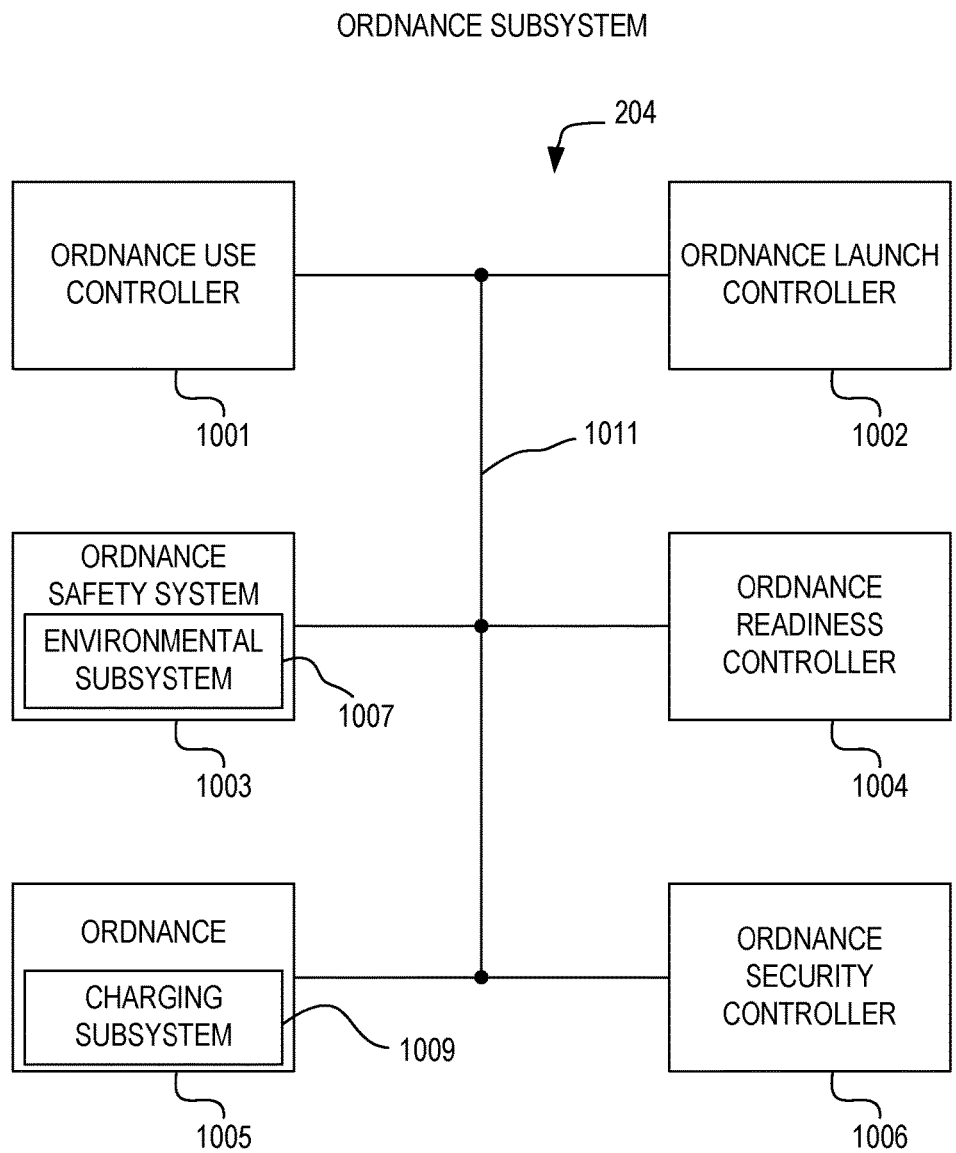
FIG. 10 is a block diagram illustrating an ordnance subsystem of a UAV system in accordance with at least one embodiment.

FIG. 10 is a block diagram illustrating an ordnance subsystem of a UAV system in accordance with at least one embodiment. Ordnance subsystem 204 comprises ordnance use controller 1001, ordnance launch controller 1002, ordnance safety system 1003, ordnance readiness controller 1004, ordnance 1005, and ordnance security controller 1006. Each of such elements is coupled to at least another of such elements. In the illustrated example, the elements are coupled to each other via interconnect 1011. Ordnance safety system 1003 comprises environmental subsystem 1007.

Ordnance 1005 may, for example, be an UCAV carrying an explosive payload. For example, the explosive payload may comprise an explosive charge in an unprefragmented housing, an explosive charge in a prefragmented housing, thermobaric explosive payload, an electromagnetic explosive payload, or another type of explosive payload. Ordnance 1005 may comprise a charging subsystem 1009, which may, for example, cooperate with power subsystem 210 to allow charging (and subsequent recharging) of ordnance 1005. As an example, ordnance 1005 in the form of a UCAV can include a rechargeable battery to power a propulsion system, such as a propeller system. Charging subsystem 1009 can charge the rechargeable battery of the UCAV. The UCAV can be deployed on multiple sorties, being recharged from time to time to continue to power the propulsion system over the multiple sorties. The rechargeable battery of the UCAV can also power other systems of the UCAV besides the propulsion system.

Ordnance security controller 1006 can operate to maintain security of ordnance 1005. As an example, ordnance security controller 1006 can be configured to detect tampering with UAV system 100 that poses a security risk to ordnance 1005. Ordnance security controller 1006 can be configured, for example, to temporarily or permanently disable ordnance 1005 in response to a detected security risk.

Ordnance safety system 1003 can monitor conditions affecting safety of ordnance 1005. As an example, ordnance safety system 1003 can include environmental subsystem 1007. Environmental subsystem 1007 can monitor environmental conditions to which ordnance 1005 is exposed. Based on the monitored environmental conditions, ordnance safety system 1003 can determine whether the safety of ordnance 1005 has been compromised. In the event of the safety has been compromised, ordnance safety system 1003 can communicate a warning to other components of ordnance subsystem 204, such as to ordnance readiness controller 1004, ordnance use controller 1001, and ordnance launch controller 1002 to warn of potential safety risks concerning ordnance 1005. The other components can perform risk mitigation actions, such as inhibiting launch of ordnance 1005, rendering ordnance 1005 inert, or jettisoning ordnance 1005. The jettison process can be coordinated with other subsystems, such navigation subsystem 206, sensor subsystem 208, and database subsystem 205, to command self-destruction of ordnance 1005 after ordnance 1005 has been jettisoned to a safe location.

Ordnance readiness controller 1004 manages readiness of ordnance 1005 for use. Ordnance readiness controller 1004 can receive ordnance security information from ordnance security controller 1006, ordnance safety information from ordnance safety system 1003, and ordnance self-test information from ordnance 1005. Ordnance readiness controller 1004 can use such information to determine an overall readiness of ordnance 1005 for use.

Ordnance use controller 1001 manages confirmation of authority to use ordnance 1005. For example, ordnance use controller can receive a message via communications subsystem 201, which may have been decrypted via cryptographic system 1106, to authorize the use of ordnance 1005 or alternatively, to delegate the authority to use ordnance 1005 to processing subsystem 203, allowing UAV system 100 to use ordnance 1005 autonomously.

Ordnance launch controller 1002 controls a launch sequence of ordnance 1005 when ordnance use controller 1001 has confirmed authority to use ordnance 1005. Ordnance launch controller 1002 monitors conditions for a safe launch of ordnance 1005 and is able to inhibit launch when such conditions are not met and to proceed with launch when such conditions are met.

Figure 11:
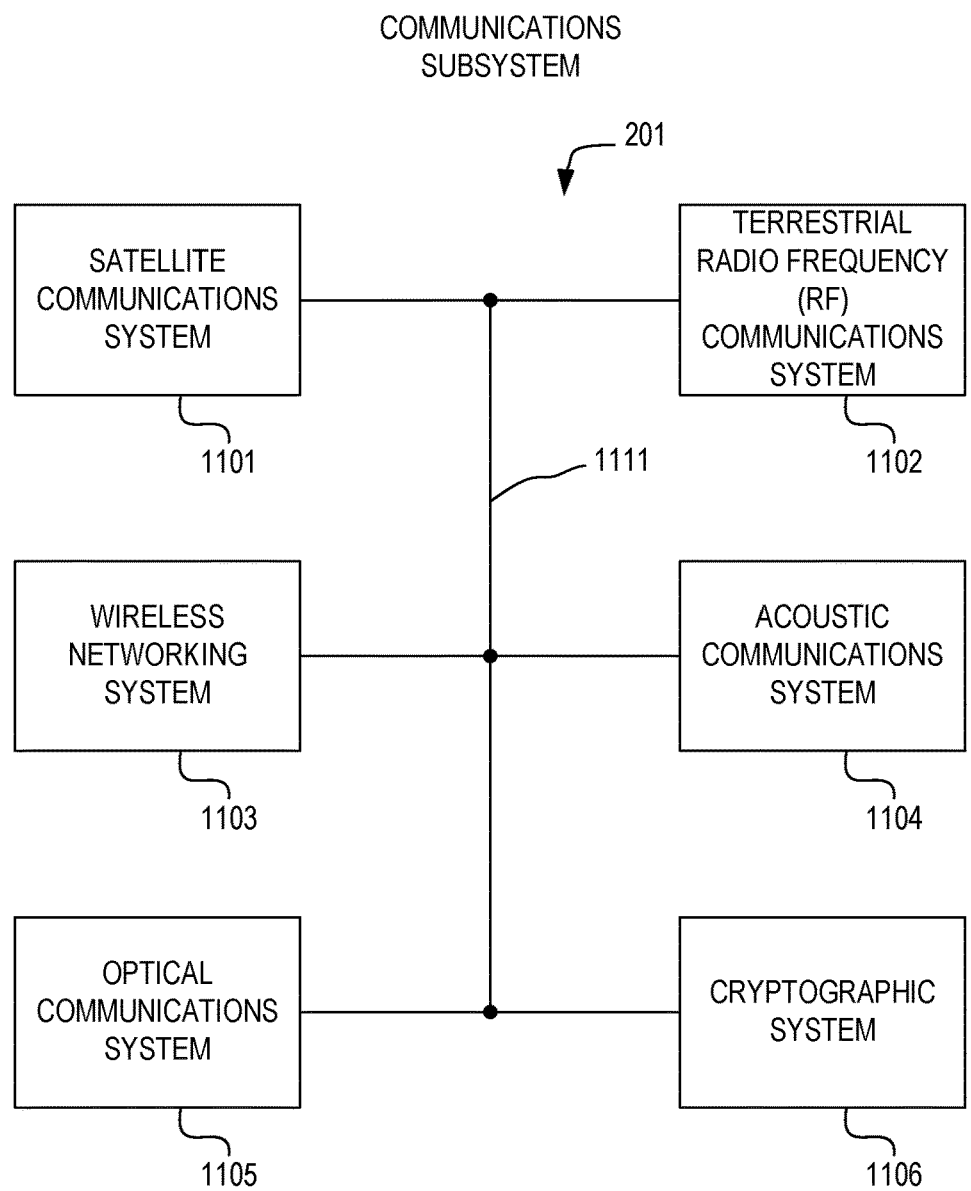
FIG. 11 is a block diagram illustrating a communications subsystem of a UAV system in accordance with at least one embodiment.

FIG. 11 is a block diagram illustrating a communications subsystem of a UAV system in accordance with at least one embodiment. Communications subsystem 201 comprises satellite communications system 1101, terrestrial radio frequency (RF) communications system 1102, wireless networking system 1103, acoustic communications system 1104, optical communications system 1105, and cryptographic system 1106. Each of such elements is coupled to at least another of such elements. In the illustrated example, the elements are coupled to each other via interconnect 1111.

Satellite communications system 1101 can comprise, for example, a Fleet Satellite Communications System (FLTSATCOM) transceiver, an Ultra High Frequency (UHF) Follow-On (UFO) transceiver, a Mobile User Objective System (MUOS) transceiver, and a commercial satellite transceiver, such as an IRIDIUM satellite transceiver. Terrestrial RF communications system 1102 can comprise, for example, a terrestrial RF modem operating on one or more bands, such as a High Frequency (HF) band, a Very High Frequency (VHF) band, an Ultra High Frequency (UHF) band, and a microwave (µwave) band. Wireless networking system 1103 can comprise a WIFI wireless network transceiver (WIFI is a registered trademark of Wi-Fi Alliance), a BLUETOOTH wireless network transceiver (BLUETOOTH is a registered trademark of Bluetooth SIG, Inc.), a WIGIG wireless network transceiver (WIGIG is a registered trademark of Wi-Fi Alliance), and another type of wireless network transceiver. Acoustic communications system 1104 can comprise an acoustic modem. Optical communications system 1105 may comprise, for example, a blue/green laser communications system.

Communications subsystem 201 can communicate, for example, with a plurality of UAVs deployed by UAV system 100. As an example, communications subsystem 201 can use wireless networking system 1103 to create a communications network with the plurality of UAVs. As one example, such communications network can be a mesh network, wherein the plurality of UAVs can relay messages amongst themselves to extend the networking range. The relayed messages may originate, for example, from UAV system 100 or from one of the plurality of UAVs. The relayed messages may be destined, for example, for UAV system 100 or one of the plurality of UAVs.

Figure 12:
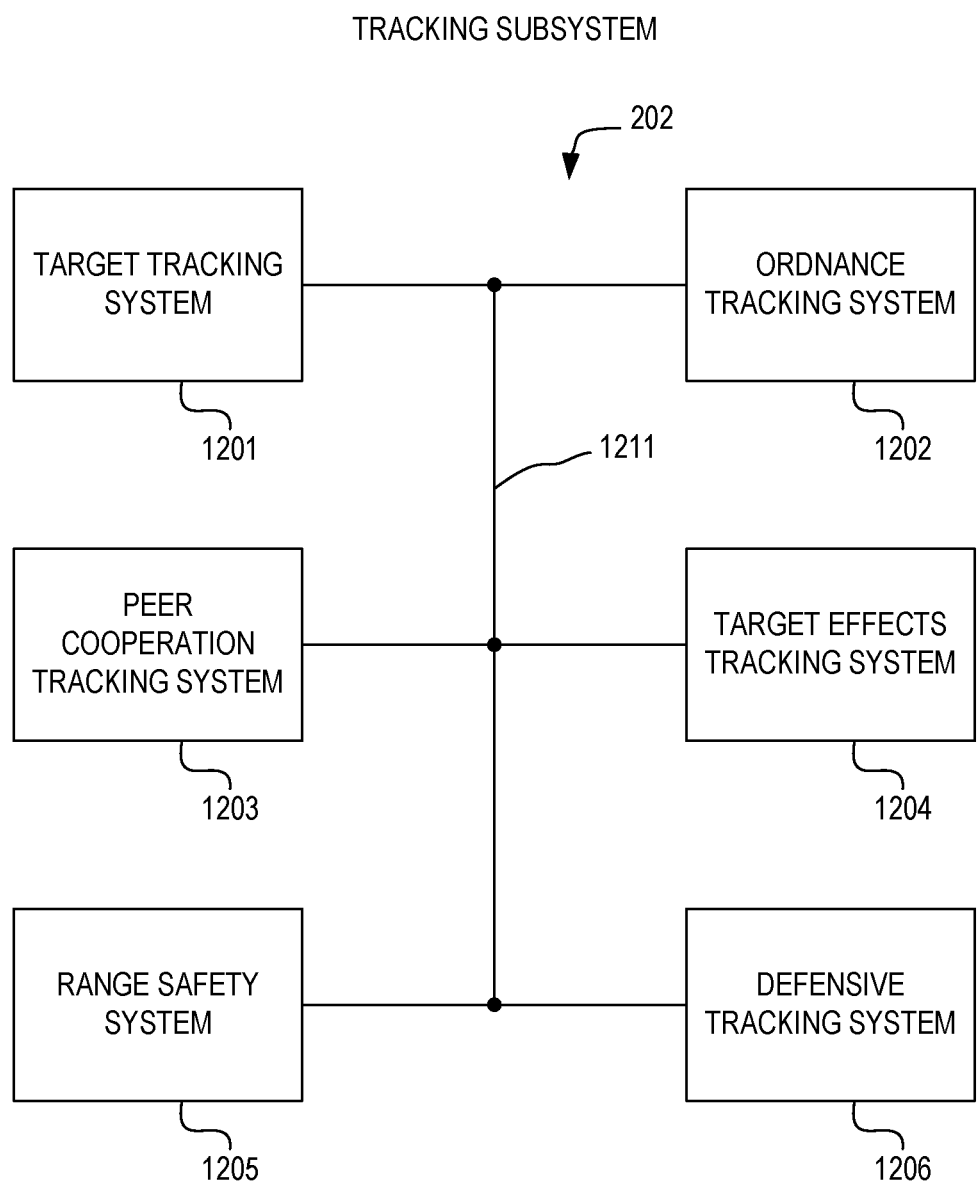
FIG. 12 is a block diagram illustrating a tracking subsystem of a UAV system in accordance with at least one embodiment.

FIG. 12 is a block diagram illustrating a tracking subsystem of a UAV system in accordance with at least one embodiment. Tracking subsystem 202 comprises target tracking system 1201, ordnance tracking system 1202, peer cooperation tracking system 1203, target effects tracking system 1204, range safety system 1205, and defensive tracking system 1206. Each of such elements is coupled to at least another of such elements. In the illustrated example, the elements are coupled to each other via interconnect 1211.

Target tracking system 1201 provides an ability to track a target acquired by sensor subsystem 208. Peer cooperation tracking system 1203 provides an ability to cooperate with the tracking subsystems of other instances of UAV system 100, allowing such other instances to act as peers in tracking. Defensive tracking system 1206 allows UAV system 100 to track threats against itself. Ordnance tracking system 1202 tracks ordnance 1005 after ordnance 1005 is launched to engage a target. Target effects tracking system 1204 tracks the effects of ordnance 1005 on the target. Range safety system 1205 obtains ordnance trajectory information as to the trajectory of ordnance 1005, for example, from ordnance tracking system 1202. Range safety system 1205 can take protective action, for example, commanding destruction of ordnance 1005, if ordnance 1005 fails to maintain its intended trajectory.

Figure 13:
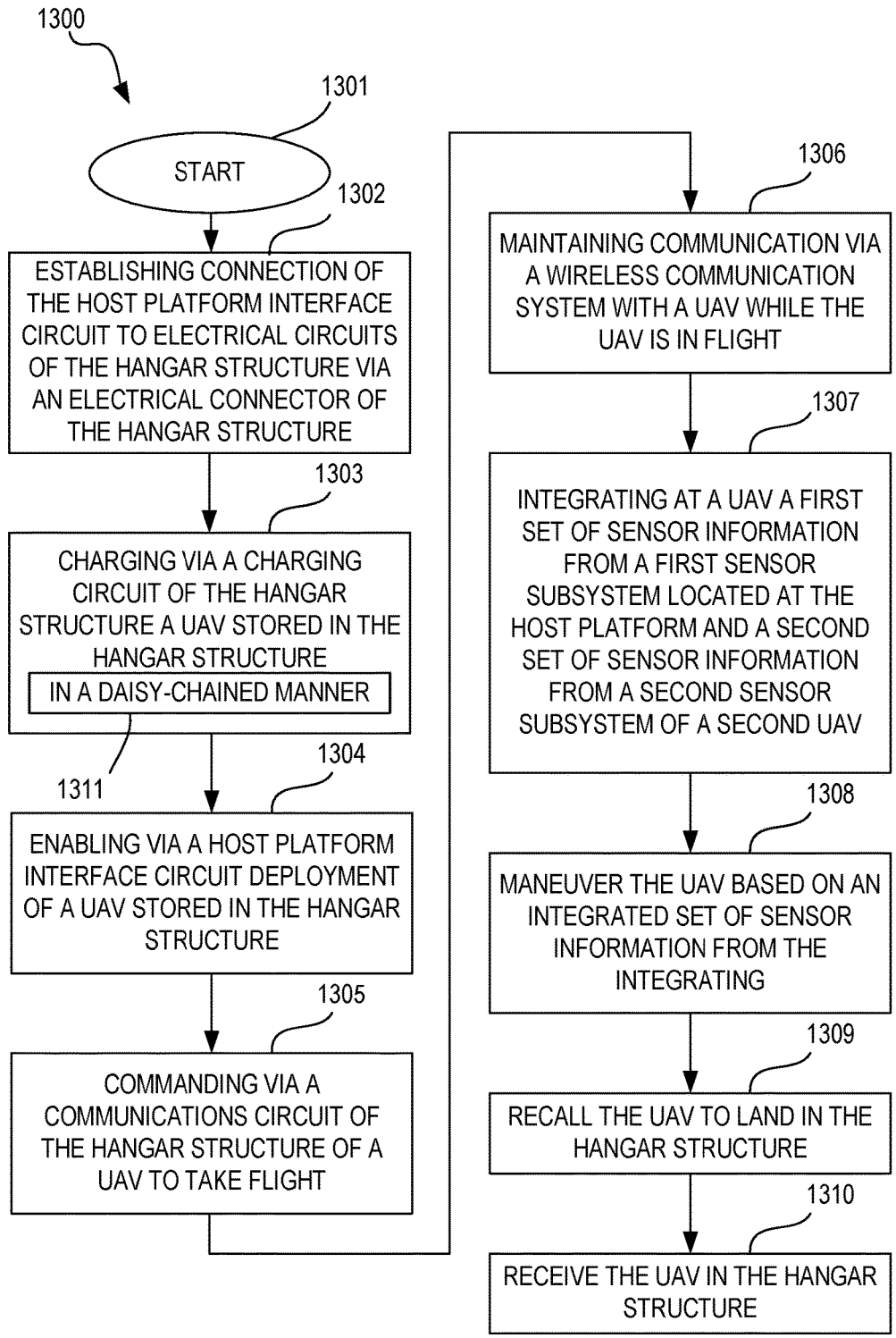
FIG. 13 is a flow diagram illustrating a method in accordance with at least one embodiment.

FIG. 13 is a flow diagram illustrating a method in accordance with at least one embodiment. Method 1300 begins at block 1301 and continues to block 1302. At block 1302, a connection is established of a host platform interface circuit to electrical circuits of a hangar structure via an electrical connector of the hangar structure. From block 1302, method 1300 continues to block 1303. At block 1303, charging is performed via a charging circuit of the hangar structure of a UAV stored in the hangar structure. Sub-block 1311 shows, according to at least one embodiment, the charging can be performed in a daisy-chained manner. According to the daisy-chained manner, a UAV to be charged can receive an electrical charge from a charging circuit of the hangar structure via one or more intervening UAVs having electrical contacts through which to convey the electrical charge to the UAV to be charged. If one or more of the intervening UAVs are also to be charged, the one or more of the intervening UAVs can draw an electrical charge for their own charging via their respective electrical contacts.

From block 1303, method 1300 continues to block 1304. At block 1304, deployment of a UAV stored in the hangar structure is enabled via a host platform interface circuit. From block 1304, method 1300 continues to block 1305. At block 1305, a UAV is commanded to take flight via a communications circuit of the hangar structure. From block 1305, method 1300 continues to block 1306. At block 1306, communication is maintained with a UAV while the UAV is in flight via a wireless communication system. From block 1306, method 1300 continues to block 1307. At block 1307, a first set of sensor information from a first sensor subsystem located at the host platform is integrated at a UAV with a second set of sensor information from a second sensor subsystem of a second UAV to form an integrated set of sensor information. From block 1307, method 1300 continues to block 1308. At block 1308, the UAV is maneuvered based on the integrated set of sensor information obtained from the integrating of block 1307. From block 1308, method 1300 continues to block 1309. At block 1309, the UAV is recalled to land in the hangar structure. From block 1309, method 1300 continues to block 1310. At block 1310, the UAV is received in the hangar structure.

Figure 14:
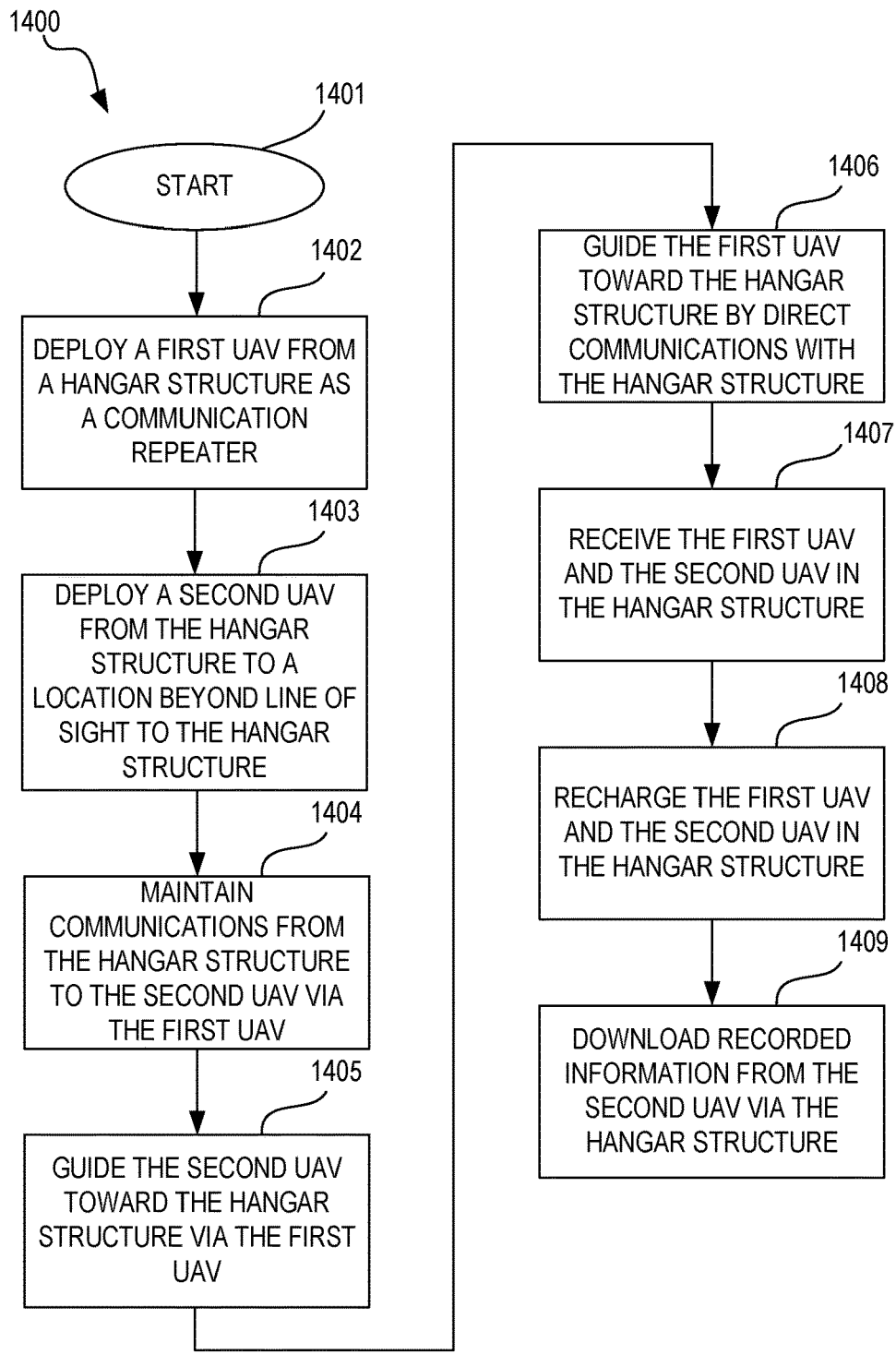
FIG. 14 is a flow diagram illustrating a method in accordance with at least one embodiment.

FIG. 14 is a flow diagram illustrating a method in accordance with at least one embodiment. Method 1400 begins at block 1401 and continues to block 1402. At block 1402, a first UAV is deployed from a hangar structure as a communication repeater. As an example, the first UAV can be configured to receive a wireless communication signal from the hangar structure and relay the communication signal to a second UAV, which may, for example, be located beyond direct line-of-sight wireless communication range of the hangar structure. As another example, the first UAV can be configured to receive a wireless communication signal from the second UAV and relay the communication signal to the hangar structure, which may be located beyond direct line-of-sight wireless communication range. As a further example, the first UAV can be configured to provide bidirectional relay of communication signals between the hangar structure and the second UAV.

From block 1402, method 1400 continues to block 1403. At block 1403, a second UAV is deployed from the hangar structure to a location beyond the line of sight of the hangar structure. The line of sight may be obstructed by terrain, by appurtenances to the terrain, such as bushes, trees, and buildings, or by the curvature of the earth between the hangar structure and the second UAV. From block 1403, method 1400 continues to block 1404. At block 1404, communications are maintained from the hangar structure to the second UAV via the first UAV. As an example, the first UAV can act as a communication repeater with direct communication between the first UAV and the hangar structure and with direct communication between the first UAV and the second UAV. As another example, the first UAV can cooperate with one or more other UAVs to relay communications between the second UAV and the hangar structure. For example, the first UAV can form a mesh network with the one or more other UAVs to relay communications between the second UAV and the hangar structure. According to the mesh network, multiple dynamically reconfigurable paths can be provided between the second UAV and the hangar structure, and, if the first UAV or one or more of the one or more other UAVs were to be unable to participate in relaying communications between the second UAV and the hangar structure, the mesh network could adaptively select an available path from among the remaining dynamic reconfigurable paths, thereby providing a robust, adaptive wireless network to relay communications between the second UAV and the hangar structure.

From block 1404, method 1400 continues to block 1405. At block 1405, the second UAV is guided toward the hangar structure via the first UAV. As an example, the hangar structure can provide instructions, such as geographic coordinates of the hangar structure, to the second UAV via the first UAV. As another example, the first UAV, which can be located closer to the hangar structure relative to the distance of the second UAV from the hangar structure, can guide the second UAV toward the hangar structure. When the second UAV is sufficiently close to the hangar structure to communicate directly with the hangar structure, the hangar structure may communicate directly with the second UAV to provide instructions, such as geographic coordinates of the hangar structure, directly to the second UAV. Such a multi-stage provision of guidance of the second UAV to the hangar structure can provide some obfuscation of the location of the hangar structure and the host platform on which it is mounted, which can provide improved security of the hangar structure and the host platform on which it is mounted.

From block 1405, method 1400 continues to block 1406. At block 1406, the first UAV is guided toward the hangar structure by direct communications with the hangar structure. From block 1406, method 1400 continues at block 1407. At block 1407, the first UAV and the second UAV are received at the hangar structure. The hangar structure can provide deconfliction of the UAVs taking flight from and landing at the hangar structure. For example, the hangar structure can compare the timing and flight paths of the UAVs to assure that each UAV has a flight path clear of other UAVs. The hangar structure can cooperate with other hangar structures to assure that the timings and flight paths of UAVs to and from the multiple hangar structures do not conflict with each other and present a hazard to any of the UAVs. The hangar structure can also cooperate with flying UAVs, which need not have taken flight from the hangar structure, such as flying UAVs that took flight from a hangar structure mounted on a different host platform, to include such flying UAVs in the deconfliction regardless of the hangar structure from which the flying UAVs took flight. From block 1407, method 1408 continues to block 1409. At block 1409, the first UAV and the second UAV are recharged in the hangar structure. As an example, the first UAV and the second UAV can be recharged in a daisy-chained manner, wherein electrical power to perform the recharging of one UAV is coupled through electrical contacts on another UAV to convey the electrical power from the hangar structure. As another example, each of the first UAV and the second UAV can be connected directly to the hangar structure in a non-daisy-chained manner. From block 1409, method 1400 continues to block 1410. At block 1410, recorded information is downloaded from the second UAV via the hangar structure. The recorded information may, for example, be sensor information from surveillance performed by the second UAV while in flight, ordnance engagement information recorded by the second UAV while engaging a target with ordnance borne by the second UAV, ordnance engagement information recorded by the second UAV of another asset, such as an unmanned combat aerial vehicle (UCAV), engaging a target with ordnance borne by that asset, damage assessment information recorded by the second UAV after ordnance was used against a target, or other recorded information.

Figure 15:
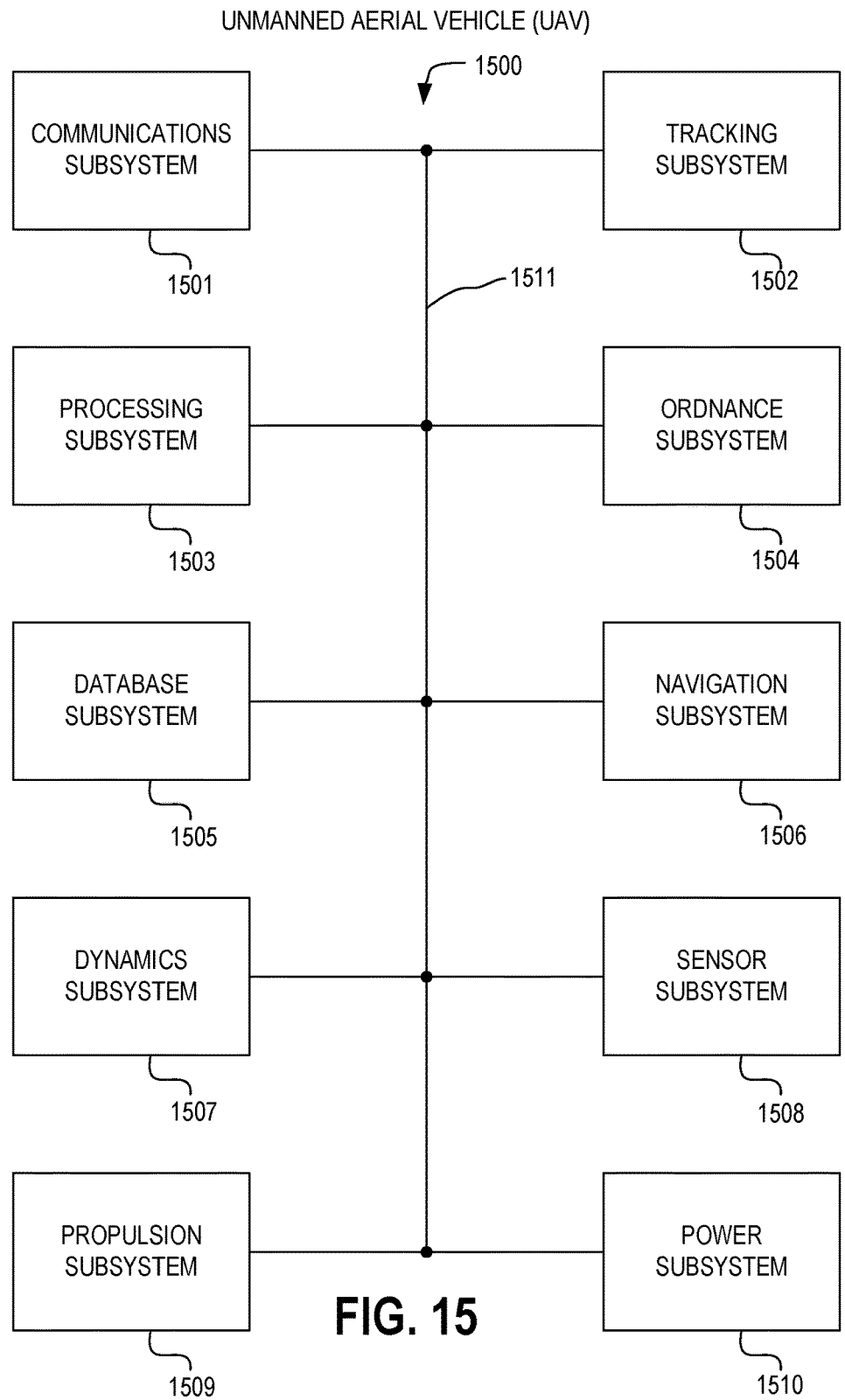
FIG. 15 is a block diagram illustrating an unmanned aerial vehicle (UAV) in accordance with at least one embodiment.

FIG. 15 is a block diagram illustrating an unmanned aerial vehicle (UAV) in accordance with at least one embodiment.

UAV 1500 comprises communications subsystem 1501, tracking subsystem 1502, processing subsystem 1503, ordnance subsystem 1504, database subsystem 1505, navigation subsystem 1506, dynamics subsystem 1507, sensor subsystem 1508, propulsion subsystem 1509, and power subsystem 1510. Each of such subsystems is coupled to at least another of such subsystems. In the illustrated example, the subsystems are coupled to each other via interconnect 1511. Other embodiments may be implemented with a subset of the above subsystems or with additional subsystems beyond the above subsystems or a subset thereof.

Communication subsystem 1501 of UAV 1500 can be used, for example, to communicate with other UAVs and, for example, to communicate with UAV system 100. Such communication can be used, for example, to coordinate flight of UAVs. Examples of coordination include an ability to configure the flight of UAVs into a defensive swarm and an ability to configure UAVs to engage, in a serial, parallel, or combined parallel and serial manner, targeted threats. Such targeted threats can include, for example, airborne threats and seaborne threats. Examples of airborne threats include cruise missiles and ASW ordnance and delivery systems. Examples of seaborne threats include hydrofoils and high-speed gunboats.

Tracking subsystem 1502 of UAV 1500 can provide tracking of UAV 1500 relative to UAV system 100, tracking of other UAVs relative to UAV 1500, and tracking of potential targets and confirmed targets. Tracking subsystem can utilize radar, radio frequency (RF), optical, acoustic, and other types of tracking components.

Processing subsystem 1503 of UAV 1500 can send and receive information from other subsystems of UAV 1500. Processing subsystem 1503 can obtain data from database subsystem 1505 and can use the data obtained to characterize the information received from other subsystems of UAV 1500. Processing subsystem 1503 can also send and receive information to and from other entities, such as other UAVs and UAV system 100, via communication subsystem 1501. Processing subsystem 1503 of UAV 1500 can be configured to communicate with another UAV. The first and second UAVs can use either or both of their respective processing subsystems to plan cooperative operations, such as engagement of a confirmed target by at least one of the UAVs in coordination with the other UAV. The first and second UAVs can be configured to deploy cooperatively with additional UAVs, such as UCAVs, to form an aerial minefield employable against the confirmed target.

Ordnance subsystem 1504 of UAV 1500 can provide elements to defeat targets to be engaged by UAV 1500. As examples, ordnance subsystem 1504 may comprise an explosive charge in an unprefragmented housing, an explosive charge in a prefragmented housing, thermobaric explosive payload, an electromagnetic explosive payload, or another type of explosive payload. As another example, ordnance subsystem 1504 may comprise a kinetic payload to impact matter with a target. As another example, ordnance subsystem 1504 may comprise a non-explosive electromagnetic payload, such as a laser or high-energy RF (HERF), payload to deliver intense electromagnetic energy to a target. In accordance with at least one embodiment, ordnance subsystem 1504 can provide an "aerial mine" capability to UAV 1500, with other subsystems of UAV 1500 positioning UAV 1500 in an expected path of a target and ordnance subsystem 1504 engaging the target in proximity to UAV 1500. The ordnance is deliverable by one or more UAVs against one or more targets. At least a portion of the ordnance is expendable against the one or more targets.

Navigation subsystem 1506 of UAV 1500 allows UAV 1500 to obtain information as to its location. UAV 1500 can obtain information as to the locations of other objects, such as other UAVs, UAV system 100, and one or more targets, for example, via communication subsystem 1501. Processing subsystem 1503 can process the locations, as well as directions and speeds of motions, to map out the space within which UAV 1500 operates. UAV 1500 can pass its location information and its mapping of space to other objects, such as other UAVs and UAV system 100, which can map out the spaces within which they operate.

Dynamics subsystem 1507 provides compensation for dynamics effects on UAV 1500. As an example, dynamics subsystem 1507 can adjust elements of UAV 1500 to compensate for the effect of wind on the flight of UAV 1500. As other examples, dynamics subsystem 1507 can adjust elements of UAV 1500 to compensate for effects of temperature, humidity, barometric pressure, precipitation, and other phenomena on the flight of UAV 1500. As another example, dynamics subsystem 1507 can adjust elements of UAV 1500 to compensate for effects of speed on aerodynamic surfaces of UAV 1500 and for effects of weight distribution in UAV 1500.

Sensor subsystem 1508 can includes sensors for detecting information from the environment around UAV 1500. For example, sensor subsystem 1508 can include still cameras, video cameras, infrared cameras, ultraviolet cameras, multispectral cameras, radars, RF sensors, optical sensors, acoustic sensors, pressure sensors, altimeters, airspeed sensors, wind sensors, chemical sensors, and other sensors. Information from such sensors can be used by processing subsystem 1503 and can supplement information used by other UAVs and UAV system 100, which can be communicated by communications subsystem 1501. Information from such sensors can be supplemented by information from sensors of other objects, such as other UAVs and UAV system 100, which can be received by communications subsystem 1501.

Propulsion subsystem 1509 can include motors, for example, for vertical propulsion to keep UAV 1500 aloft and, for example, for horizontal propulsion to move UAV 1500 from one location to another. Propulsion subsystem 1509 can include feedback sensors or can obtain feedback from other subsystems, such as navigation subsystem 1506, to determine actual propulsion provided by propulsion subsystem 1509.

Power subsystem 1510 can include a battery system, such as a rechargeable battery system, a charging system, a battery management system, and a load management system to manage the operation of UAV 1500 in response to the state of charge of its battery system. As an example, UAV 1500 can be configured to return to UAV system 100 as a state of charge of the battery system declines past a predetermined value. The return of UAV 1500 to UAV system 100 can be coordinated with other UAVs to avoid collision of multiple returning UAVs to UAV system 100. Upon return of UAV 1500 to UAV system 100, UAV system 100 can use its power subsystem to recharge the battery system of power subsystem 1510 of UAV 1500. With sufficient state of charge in the battery system of power subsystem 1510 of UAV 1500, UAV 1500 can again take flight from UAV system 100 to resume its mission or to be tasked to perform a new mission.

In accordance with at least one embodiment, the UAV system can act as a docking station for a plurality of UAVs. The UAVs can be deployed individually or in small numbers, for example, to act as aerial scouts for reconnaissance of potential threats. As the individual or few UAVs return to the UAV system for replenishment, such as recharging of their batteries, another UAV or other UAVs can be deployed from the UAV system to maintain constant vigilance. As one example, the UAV system can include processing circuitry to manage deconfliction of incoming and outgoing UAVs. As another example, the UAVs can coordinate with each other to manage their own deconfliction.

As another example, the UAVs can be deployed in large numbers, up to and including all of the UAVs carried by the UAV system. A portion of a large number of UAVs can return to the UAV system for replenishment, such as recharging of their batteries and, for embodiments where the ordnance is separable from the UAVs, reloading ordnance.

In accordance with at least one embodiment, the UAVs can use their own sensing and tracking subsystems to sense and track one or more targets. The UAVs can coordinate their sensing and tracking of targets using their communication subsystems. The UAVs can coordinate their employment of ordnance to engage one or more targets using their communication subsystems. In accordance with at least one embodiment, the UAVs can obtain sensing and tracking information from another source, such as from the UAV system, from a naval surface ship, from a naval submarine, from an aircraft, or from a spacecraft, such as a satellite.

In accordance with at least one embodiment, the UAVs can maintain a deployed configuration flying in formation with each other, ready for any threat that may be encountered. In accordance with at least one embodiment, the UAVs can respond reactively to detection of a threat, forming a flying formation in response to the detection. In either case, the formation may be predefined or may be adaptive to the detected threat. As an example, the formation may be configured to exhibit a swarm behavior dynamically presenting a distribution of UAVs in airspace configured to improve a likelihood of interception of the detected threat. As another example, the formation may be configured to exhibit a counter-swarm behavior dynamically presenting a distribution of UAVs in airspace configured to improve a likelihood of interception of a large number of simultaneous threats, such as threats flying in the form of a swarm.

As an example, a UAV can obtain information about an expected flight path of a threat using its own sensor subsystem and tracking subsystem or with the assistance of other assets, such as one or more other UAVs and one or more naval surface vessels, naval subsurface vessels, aircraft, or spacecraft. The UAV can extrapolate the expected flight path of the threat to an expected intercept point accessible to the ordnance of one or more UAVs within the time constraints imposed by the approaching threat. The UAV can direct itself, another UAV, or a combination thereof to the expected intercept point. As the threat approaches the expected intercept point, the UAV or other UAV or UAVs directed to the expected intercept can relocate to adapt their position to a refined expected intercept point. In the case of multiple UAVs being deployed to intercept the target, the UAVs can be deployed in a formation, such as a uniform spatial distribution or a weighted spatial distribution, in the vicinity of the expected intercept point. In the case of multiple targets against which multiple UAVs are deployed, the UAVs can be directed to multiple respective expected intercept points to provide a counter-swarm configuration of the multiple UAVs to engage the multiple targets. In accordance with at least one embodiment, the expected intercept point or multiple respective intercept points can be based on one or more expected paths of one or more targets, wherein the one or more expected paths can be one or more expected flight paths for one or more airborne threats or one or more expected surface paths for one or more surface threats, such as hostile surface vessels, for example, hydrofoil surface vessels or high-speed gunboats.

Figure 16:
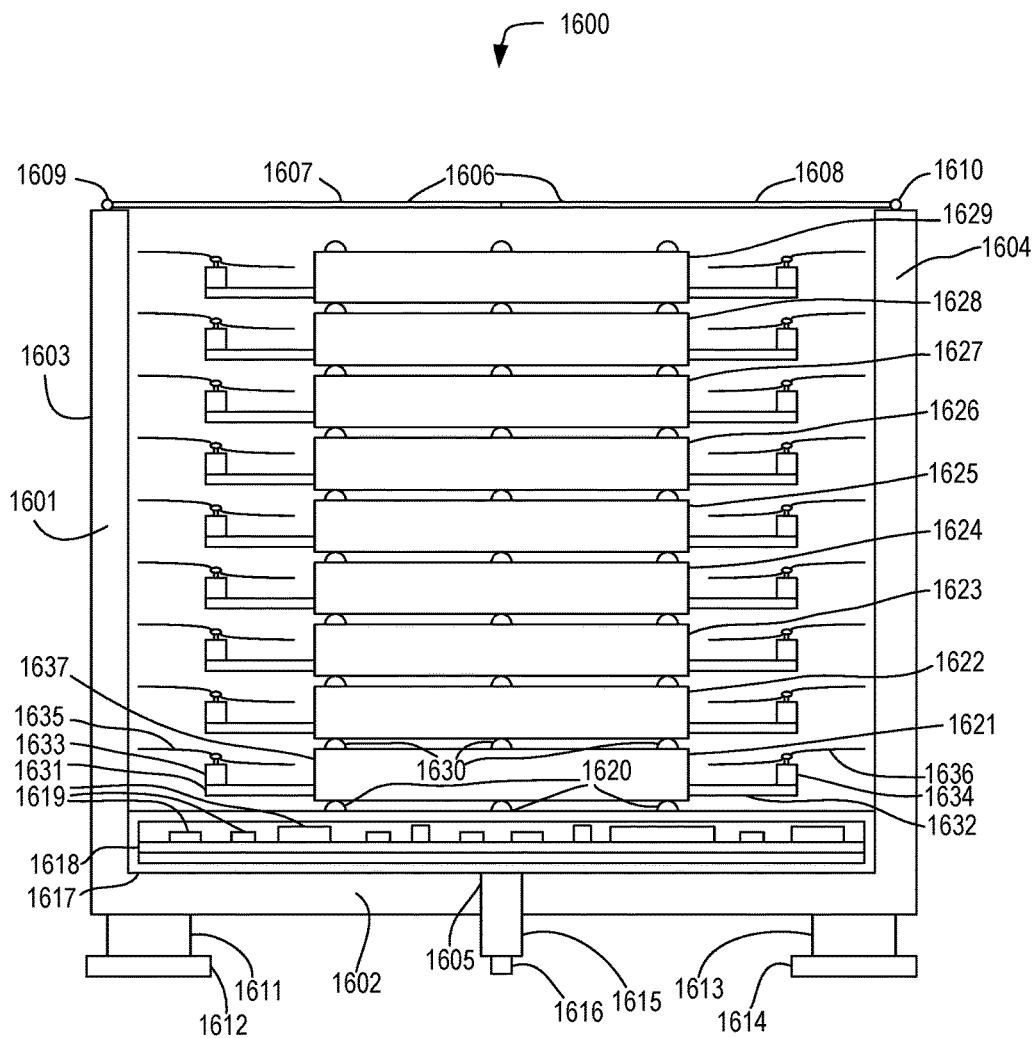
FIG. 16 is a cross sectional diagram illustrating an UAV system in accordance with at least one embodiment.

FIG. 16 is a cross sectional diagram illustrating an UAV system in accordance with at least one embodiment. UAV system 1600 may include, be included within, or correspond to the UAV system 100 of FIG. 1. UAV system 1600 comprises a plurality of UAVs 1621, 1622, 1623, 1624, 1625, 1626, 1627, 1628, and 1629 and a hangar 1601 from which the plurality of UAVs 1621-1629 may be deployed and to which the plurality of UAVs 1621-1629 may return after a sortie. Hangar 1601 comprises a hangar base 1602 and hangar walls 1603 and 1604 defining an enclosure. At the top of hangar walls 1603 and 1604 is a protective hangar closure 1606. In the illustrated example, protective hangar closure 1606 comprises hangar door 1607 on hangar door hinge 1609 and hangar door 1608 on hangar door hinge 1610. Hangar door hinge 1609 is connected to hangar wall 1603. Hangar door hinge 1610 is connected to hangar wall 1604.

Hangar 1601 comprises mounting hardware, such as anchor point 1611 and anchor point 1613. Hangar 1601 can be anchored to a structure at anchor points 1611 and 1613. Examples of structures to which hangar 1601 can be anchored include vehicles, vessels, and buildings. An anchor flange 1612 is provided on anchor point 1611, and an anchor flange 1614 is provided on anchor point 1613. Anchor flanges 1612 and 1614 allow a mount on the structure to latch onto anchor points 1611 and 1613 securely.

A hole 1605 is defined through base 1602 of hangar 1601. An electrical conduit 1615 passes through hole 1605. An electrical connector 1616 is provided at a lower end of electrical conduit 1615. Electrical connector 1616 provides one or more electrical connections between hangar 1601 and the structure on which hangar 1601 is mounted. The electrical connections can provide, for example, power, data signals, and control signals to hangar 1601. As another example, data signals and control signals from hangar 1601 can be conveyed to the structure on which hangar 1601 is mounted via the electrical connections.

Electrical conduit 1615 can convey the power and signals of the one or more electrical connections to an electronics module 1617 of hangar 1601. Electronics module 1617 comprises a circuit board 1618. Electrical components 1619 are mounted on circuit board 1618. Electronics module 1617 provides electrical contacts 1620 for electrical connection to UAV 1621. UAV 1621 has corresponding electrical contacts to enable such a connection. UAV 1621 also has, on an opposite surface, electrical contacts 1630 for electrical connection to UAV 1622. Electrical contacts 1630 can provide electrical connection from UAV 1621 to UAV 1622 in a manner similar to that in which electrical contacts 1620 provide electrical connection from electronics module 1617 to UAV 1621. UAV 1622 has corresponding electrical contacts to enable such a connection.

In accordance with at least one embodiment, UAV circuits of UAVs 1621-1629 can cooperate with each other in a daisy-chained manner. For example, UAV 1621 can convey signals from electrical contacts 1620 to electrical contacts 1630, which can convey the signals to UAV 1622. UAV 1622 can likewise convey the signals to UAV 1623. UAV 1623 can likewise convey the signals to UAV 1624 and so on. In accordance with at least one embodiment, a bus structure, such as a power bus and a communication bus, can convey signals, such as power signals and communication signals, respectively, directly from electronics module 1617 to each of UAVs 1621-1629 in a non-daisy-chained manner. In accordance with at least one embodiment, a hybrid configuration may be provided, wherein a bus structure provides conveyance of signals to at least some of UAVs 1621-1629 while at least some of UAVs 1621-1629 convey signals in a daisy-chained manner to others of UAVs 1621-1629.

UAV 1621 comprises a body 1637 and at least one propulsion system. Body 1637 comprises subsystems such as those shown in FIG. 15. In the illustrated example, a propulsion system comprises strut 1631, propulsion motor 1633, and rotor blade 1635, and another propulsion system comprises strut 1632, propulsion motor 1634, and rotor blade 1636. UAVs 1622-1629 have similar construction comprising similar components. The similar construction comprising similar components allows interchange of the positions of UAVs 1621-1629 within hangar 1601 and substitution of other similarly constructed UAVs that may arrive at hangar 1601 over the course of deployment of UAVs from one or more hangars 1601 and return of at least some of the UAVs to hangar 1601. As the one or more hangars 1601 are interchangeable and the UAVs 1621-1629, as well as any other UAVs from any other hangars 1601, are interchangeable, a UAV from one hangar may return to the same hangar or to another hangar. The UAVs from one hangar need not all return to only one hangar. Rather, some UAVs may return to the hangar from which they took flight and other UAVs may land at a different hangar. As another example, all UAVs taking flight from one hangar may land at a different one or more hangars from the one from which they took flight.

The choice of hangar to which a UAV returns can be selected, for example, based on a distance from the UAV to the hangar. For example, a UAV may return to the nearest hangar at the end of a sortie. As another example, the choice of hangar to which a UAV returns can be selected based on a vacancy at the hangar. For example, if nearer hangars are full of UAVs, a UAV may select a farther hangar that has a vacancy to accept the UAV. As another example, a hangar may be chosen to provide physical delivery of a payload of the UAV to the hangar. As an example, a UAV can carry with it a payload from a departure hangar to an arrival hangar. Examples of payloads that may be carried include fuel, a battery, ammunition, communications gear, lighting equipment, tools, spare parts, and physical media, which may, for example, carry data providing communication or intelligence information. As example, such data can be conveyed physically from one hangar to another hangar, providing security against hostile signals intelligence (SIGINT) efforts.

Drain holes can be provided in base 1602 of hangar 1601 to allow removal of water and debris from hangar 1601. In accordance with at least one embodiment, the drain holes can be configured to cooperate with the action of UAVs 1621-1629, for example, with the rotor wash of UAVs 1621-1629, to provide a self-cleaning capability for the interior of hangar 1601 during the operation of the UAV system. The drain holes can be used in conjunction with a chemical, biological, and radiological (CBR) decontamination system for hangar 1601, in accordance with at least one embodiment.

The concepts of the present disclosure have been described above with reference to specific embodiments. However, one of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. An unmanned aerial vehicle (UAV) system comprising:
a hangar structure comprising mounting hardware to mount on a host platform, the hangar structure further comprising a charging circuit and a communications circuit; and
a plurality of unmanned aerial vehicles (UAVs) arranged in a stack, a particular UAV of the plurality of UAVs comprising:
a battery;
first electrical contacts on a first surface, the first electrical contacts configured to receive power to charge the battery from electrical contacts of an additional UAV located below the particular UAV in the stack and in physical contact with the particular UAV; and
second electrical contacts on a second surface, the second electrical contacts configured to provide power to electrical contacts of another UAV that is located above the particular UAV in the stack and in physical contact with the particular UAV.

2. The UAV system of claim 1, wherein the hangar structure comprises an electrical connector configured to connect a plurality of electrical circuits to the host platform.

3. The UAV system of claim 1, wherein the hangar structure comprises a communicative element including an antenna, a beacon, or both, the communicative element configured to communicate with the plurality of UAVs.

4. The UAV system of claim 1, wherein a first UAV of the plurality of UAVs is configured to communicate with a second UAV of the plurality of UAVs for coordinating operation of the first UAV and the second UAV.

5. The UAV system of claim 4, wherein the first UAV comprises a first communications subsystem configured to communicate with a second communications subsystem of the second UAV, wherein the first UAV further comprises a first processing subsystem to communicate with a second processing subsystem of the second UAV to plan cooperative operation of the first UAV and the second UAV.

6. The UAV system of claim 1, wherein the hangar structure further comprises a processing circuit configured to control a first UAV and a second UAV, based on comparison of respective flight paths, to avoid conflicts as the first UAV and the second UAV attempt to land in the hangar structure.

7. The UAV system of claim 1, wherein the plurality of UAVs are configured to cooperate with each other in a daisy-chained manner to charge batteries and to communicate with control circuits while the plurality of UAVs are in the stack within the hangar structure.

8. The UAV system of claim 1, wherein the second surface is on an opposite side of the particular UAV than the first surface.

9. A hangar structure comprising:
an enclosure having a door selectively defining an opening configured to enable a plurality of unmanned aerial vehicles (UAVs) to take flight;

mounting hardware, the mounting hardware configured to mount the hangar structure on a host platform;

a support surface configured to support the plurality of UAVs in a stack; and a charging circuit, the charging circuit comprising a set of electrical contacts on the support surface, the set of electrical contacts configured to provide power to each UAV of the stack of the plurality of UAVs via first electrical contacts of a first UAV located on a bottom of the stack, wherein the first UAV comprises the first electrical contacts on a first surface of first UAV and second electrical contacts on a second surface of the first UAV, the first electrical contacts configured to receive power from the set of electrical contacts on the support surface, and the second electrical contacts configured to provide power to electrical contacts of a second UAV that is located above the first UAV in the stack and in physical contact with the first UAV.

10. The hangar structure of claim 9, wherein a plurality of electrical circuits are configured to charge batteries of the plurality of UAVs and to communicate with control circuits of the plurality of UAVs.

11. The hangar structure of claim 9, further comprising: an electrical connector configured to connect the hangar structure to the host platform.

12. The hangar structure of claim 9, further comprising: a communicative element including an antenna, a beacon, or both, the communicative element configured to communicate with the plurality of UAVs.

13. The hangar structure of claim 9, wherein a communications circuit is configured to communicate with the plurality of UAVs in a daisy-chained manner.

14. The hangar structure of claim 9, further comprising: a bus structure coupled to a plurality of electrical circuits, the bus structure configured to conduct electrical signals directly from the electrical circuits to each of the plurality of UAVs.

15. The hangar structure of claim 9, further comprising: a processing circuit configured to control a third UAV and a fourth UAV, based on comparison of respective flight paths, to avoid conflicts as the third UAV and the fourth UAV attempt to land in the hangar structure.

16. A method comprising:

charging a first unmanned aerial vehicle (UAV) of a plurality of UAVs stacked in a hangar structure by applying power to first electrical contacts of the first UAV, wherein the first UAV is configured to charge a second UAV of the plurality of UAVs via second electrical contacts of the first UAV that are in physical contact with electrical contacts of the second UAV;

commanding, via a communications circuit of the hangar structure, the first UAV to take flight;

recalling the first UAV to land in the hangar structure; and receiving the first UAV in the hangar structure.

17. The method of claim 16, further comprising: establishing connection of a host platform interface circuit to electrical circuits of the hangar structure via an electrical connector of the hangar structure, wherein the electrical circuits comprise the communications circuit.

18. The method of claim 16, further comprising: integrating, at the first UAV, a first set of sensor information obtained from a first sensor subsystem located at a host platform and a second set of sensor information obtained from the second UAV of the plurality of UAVs, wherein the second UAV is distinct from the first UAV.

19. The method of claim 18, further comprising: maneuvering the first UAV based on an integrated set of sensor information obtained from the integrating.

20. The hangar structure of claim 9, wherein the door is coupled to a top of the enclosure such that, when the door is open, the door is configured to enable a top UAV of the stack to take flight vertically through the opening.

* * * * *